US012663543B2

(12) United States Patent
Park et al.

(10) Patent No.: US 12,663,543 B2
(45) Date of Patent: Jun. 23, 2026

(54) LIDAR SENSOR THAT MEASURES HORIZONTAL ANGLE USING STEP DIFFERENCE AND LIGHT REFLECTANCE

(71) Applicants: Yujin Robot Co., Ltd., Incheon (KR); Miele & Cie. KG, Gütersloh (DE)

(72) Inventors: Seong Ju Park, Incheon (KR); Chang Soo Kim, Incheon (KR); Jae Young Lee, Incheon (KR); Ju Young Kim, Incheon (KR); Moo Woong Cheon, Incheon (KR); Jae Guen Ko, Incheon (KR); Sang Su Cho, Incheon (KR)

(73) Assignees: Yujin Robot Co., Ltd, Incheon (KR); Miele & Cie. KG, Gütersloh (DE)

( * ) Notice: Subject to any disclaimer, the term of this patent is extended or adjusted under 35 U.S.C. 154(b) by 941 days.

(21) Appl. No.: 17/935,540

(22) Filed: Sep. 26, 2022

(65) Prior Publication Data

US 2023/0097670 A1     Mar. 30, 2023

(30) Foreign Application Priority Data

Sep. 27, 2021     (KR) ......................... 10-2021-0127260
Sep. 21, 2022     (KR) ......................... 10-2022-0119632

(51) Int. Cl.
    G01S 17/88         (2006.01)
    G01S 7/481         (2006.01)
    H02P 6/16          (2016.01)

(52) U.S. Cl.
    CPC ............ G01S 17/88 (2013.01); G01S 7/4813 (2013.01); H02P 6/16 (2013.01)

(58) Field of Classification Search
    None
    See application file for complete search history.

(56) References Cited

U.S. PATENT DOCUMENTS

2015/0055117 A1     2/2015     Pennecot et al.
2019/0353758 A1*   11/2019    Shin ........................ G01S 17/89
(Continued)

FOREIGN PATENT DOCUMENTS

KR     10-2019-0131401 A     11/2019
KR     10-2021-0112257 A      9/2021

OTHER PUBLICATIONS

Office Action for KR 10-2022-0119632 by Korean Intellectual Property Office dated Jan. 24, 2025.
(Continued)

*Primary Examiner* — Luke D Ratcliffe
(74) *Attorney, Agent, or Firm* — BROADVIEW IP LAW, PC

(57)     ABSTRACT

The present exemplary embodiments propose a LIDAR sensor including: a transmission/reception module which transmits transmission light and receives reflection light reflected from an object; a reflector assembly which has an empty space to assemble the transmission/reception module at one side, receives the transmission light from the transmission/reception module to reflect the transmission light toward the object and transmits the reception light reflected from the object to the transmission/reception module, a rotary module assembly which rotates the transmission/reception module and generates an RPM and a rotation angle based on a light reception amount of the reflection light which is received by a sensor unit by reflecting the transmitted light; and a fixing module which supports the transmission/reception module and the rotary module.

13 Claims, 13 Drawing Sheets

1

(56)                          References Cited

U.S. PATENT DOCUMENTS

2020/0088859 A1    3/2020  Shepard et al.
2020/0142034 A1    5/2020  Shepard et al.

OTHER PUBLICATIONS

Office Action for U.S. Appl. No. 17/935,533 by United States Patent
and Trademark Office dated Oct. 23, 2025.
Office Action for U.S. Appl. No. 17/935,537 by the United States
Patent and Trademark Office dated Dec. 10, 2025.

* cited by examiner

LIDAR SENSOR THAT MEASURES HORIZONTAL ANGLE USING STEP DIFFERENCE AND LIGHT REFLECTANCE

CROSS-REFERENCE TO RELATED APPLICATION

This application claims priority under 35 U.S.C § 119 to Korean Patent Application No. 10-2021-0127260 filed on Sep. 27, 2021, and to Korean Patent Application No. 10-2022-0119632 filed on Sep. 21, 2022, in the Korean Intellectual Property Office, the entire contents of which are hereby incorporated by reference.

BACKGROUND

Field

The present disclosure relates to a LIDAR sensor, and more particularly, to a LIDAR sensor which measures a horizontal angle using a step difference and a light reflectance.

Description of the Related Art

The contents described in this section merely provide background information on the present exemplary embodiment but do not constitute the related art.

A light detection and ranging (LIDAR) sensor is one of remote detection devices which irradiate light onto a subject, and then analyze light reflected from the subject to measure a physical property of the subject, for example, a distance, a speed, a temperature, a material distribution, and a concentration property.

The LIDAR sensor is used for various fields, such as autonomous vehicles, mobile robots, cleaning robots, and range finders. The LIDAR sensor has different specifications such as sizes, rotation speeds, or light sources, depending on a specification required for the applied field, but an operation principle of a rotary type LIDAR sensor is basically common.

However, it is important to suppress the interference between transmitted light and received light. Therefore, even though various methods have been proposed therefor in the related art, there is a limitation that a sufficient performance is not guaranteed in view of a small size LIDAR sensor.

Further, when the LIDAR sensor measures a distance to an object, a position on a 3D space of the object can be calculated by means of a distance value, a horizontal angle, and a vertical angle, but when the horizontal rotation is performed at a high speed, it is difficult to calculate an accurate angular resolution.

SUMMARY

A main object to the exemplary embodiments of the present disclosure is to precisely measure a horizontal angle of transmission light transmitted by means of a LIDAR using a step difference or a light reflectance.

Other and further objects of the present disclosure which are not specifically described can be further considered within the scope easily deduced from the following detailed description and the effect.

According to an aspect of the present exemplary embodiment, the present disclosure purposes a LIDAR sensor including a transmission/reception module which transmits transmission light and receives reflection light reflected from an object; a reflector assembly which has an empty space to assemble the transmission/reception module at one side, receives the transmission light from the transmission/reception module to reflect the transmission light toward the object and transmits the reception light reflected from the object to the transmission/reception module; a rotary module assembly which rotates the transmission/reception module and generates an RPM and a rotation angle based on a light reception amount of the reflection light which is received by a sensor unit by reflecting the transmitted light; and a fixing module which supports the transmission/reception module and the rotary module assembly.

Desirably, the rotary module assembly includes: a substrate assembly which is implemented by at least one layer so that the transmission/reception module is assembled on one side and the sensor unit is fixed to an opposite side of the side on which the transmission/reception module is assembled; a shielding sheet which is assembled so as to be spaced apart from a side surface of the substrate assembly to which the sensor unit is fixed and shields an electromagnetic wave; and a rotary frame which is fixed to at least partially abut with the fixing module and rotates with the substrate assembly and the reception sheet assembled therein.

Desirably, the substrate assembly includes: a first substrate including at least one assembly protrusion so as to assemble the transmission/reception module; a second substrate laminated on the first substrate; and a third substrate which is laminated on the second substrate and receives power from a power transmission assembly.

Desirably, the second substrate includes a transceiver which bi-directionally transmits and receives data and is implemented to shield the interference of the transmission light and the reception light and light transmitted/received by the sensor unit.

Desirably, the LIDAR sensor further includes: a slit fixing unit which is at least partially introduced in the rotary frame to be fixed so as to correspond to the sensor unit and the slit fixing unit includes: a fixing unit which is fixed to the fixing module; and at least one slit which is assembled on one side surface of the fixing unit and reflects light transmitted by the sensor unit.

Desirably, when a plurality of slits is provided, the at least one slit is assembled to be implemented to have the same area or different area to form a constant interval along one side surface of the fixing unit.

Desirably, the at least one slit is assembled to form a step with the fixing unit to calculate a rotation angle and an RPM of the rotary module assembly based on a boundary according to the step with the fixing unit, and the substrate assembly acquires an angular resolution based on the RPM and the rotation angle of the rotary module assembly which are calculated using a difference in light reception amount reflected by a boundary of at least one slit or the fixing unit.

Desirably, the rotary module assembly further includes: a power transmission assembly which is assembled to be connected by passing through a hole formed in the rotary frame and the slit fixing unit, and the power transmission assembly includes: a power reception unit which is assembled to pass through the inside of the rotary frame to be fixed and receives a power to transmit the power to the substrate assembly; and a power transmission unit which is assembled with the power reception unit by passing through the inside of the rotary frame and transmits the power to the power reception unit.

Desirably, the rotary module assembly further includes: a bearing which fixes a central axis of the rotary module assembly and supports a dead weight of the central axis and a load applied to the central axis, and the bearing is provided between the slit fixing unit and the rotary frame.

Desirably, the LIDAR sensor further includes: a rotary driving unit which is fixed to at least partially abut with the fixing unit and is connected to the rotary frame to rotate the rotary frame, and the rotary driving unit is connected to the rotary frame by means of a rotary connection unit to transmit a power to rotate the rotary frame.

Desirably, the transmission/reception module includes: a first body tube which provides a path through which the transmission light moves and is assembled with a transmission lens on a front surface; a second body tube which is spaced apart from one side surface of the first body tube, provides a path through which the reception light moves, and is assembled with a reception lens on a front surface; and a circuit board which is assembled on rear surfaces of the first body tube and the second body tube, transmits the transmission light and receives the reception light to acquire distance information to the object; and Desirably, the transmission/reception module further includes a baffle which is slidably assembled in assembly grooves formed on one side surfaces of the first body tube and the second body tube and cancels a noise due to the transmission light and the reception light, and the baffle includes a light transmission baffle which is assembled on the first body tube and has at least one groove through which the transmission light passes and a light reception baffle which is assembled on the second body tube and has at least one groove through which the reception light passes.

Desirably, the transmission/reception module further includes: a shielding assembly unit which is assembled between the first body tube and the second body tube and restricts the movement of the transmission light which passes through the first body tube to the second body tube and the movement of the reception light which passes through the second body tube to the first body tube, and the shielding assembly unit includes: a first shielding unit which is assembled to abut with one side of the first body tube and absorbs the transmission light emitted to the outside of the first body tube; a second shielding unit which is assembled to abut with one side of the second body tube and absorbs the transmission light emitted to the outside of the second body tube; and a separation unit which is provided between the first shielding unit and the second shielding unit to separate the first shielding unit and the second shielding unit from each other.

Desirably, the reflector assembly includes: a mirror housing in which the transmission/reception module is assembled on one lower side; a first reflection unit which is provided at one lower side of the mirror housing so as to correspond to the transmission/reception module; a mirror holder unit which is assembled in an assembly groove formed on the mirror housing to be fixed to the mirror housing; a mirror driving unit which provides a rotary driving force to the mirror holder unit to adjust a reflection direction of the second reflection unit; and a second reflection unit which is fixed to one side surface of the mirror holder unit to rotate by the operation of the mirror holder unit and reflects the transmission light toward the object and receives reception light reflected from the object.

According to still another aspect of the present embodiment, the present disclosure proposes a moving object including a LIDAR sensor which transmits transmission light and receives reception light and removes transmission light or reception light moving in a predetermined direction; and a moving device which is implemented to move the moving object based on the distance, and the LIDAR sensor includes: a transmission/reception module which transmits transmission light and receives reflection light reflected from an object; a reflector assembly which has an empty space to assemble the transmission/reception module at one side, receives the transmission light from the transmission/reception module to reflect the transmission light toward the object and transmits the reception light reflected from the object to the transmission/reception module, a rotary module assembly which rotates the transmission/reception module and generates an RPM and a rotation angle based on a light reception amount of the reflection light which is received by a sensor unit by reflecting the transmitted light; and a fixing module which supports the transmission/reception module and the rotary module assembly.

As described above, according to the exemplary embodiments of the present disclosure, when the LIDAR sensor horizontally rotates at a high speed, the sensor is used to form a fine angular resolution by means of a contrast of a light reflectance of a target object.

Even if the effects are not explicitly mentioned here, the effects described in the following specification which are expected by the technical features of the present disclosure and their potential effects are handled as described in the specification of the present disclosure.

BRIEF DESCRIPTION OF THE DRAWINGS

FIG. 8 is a view illustrating a cross-section of a rotary module assembly according to an exemplary embodiment of the present disclosure;

DETAILED DESCRIPTION OF THE EMBODIMENT

Figure 1:
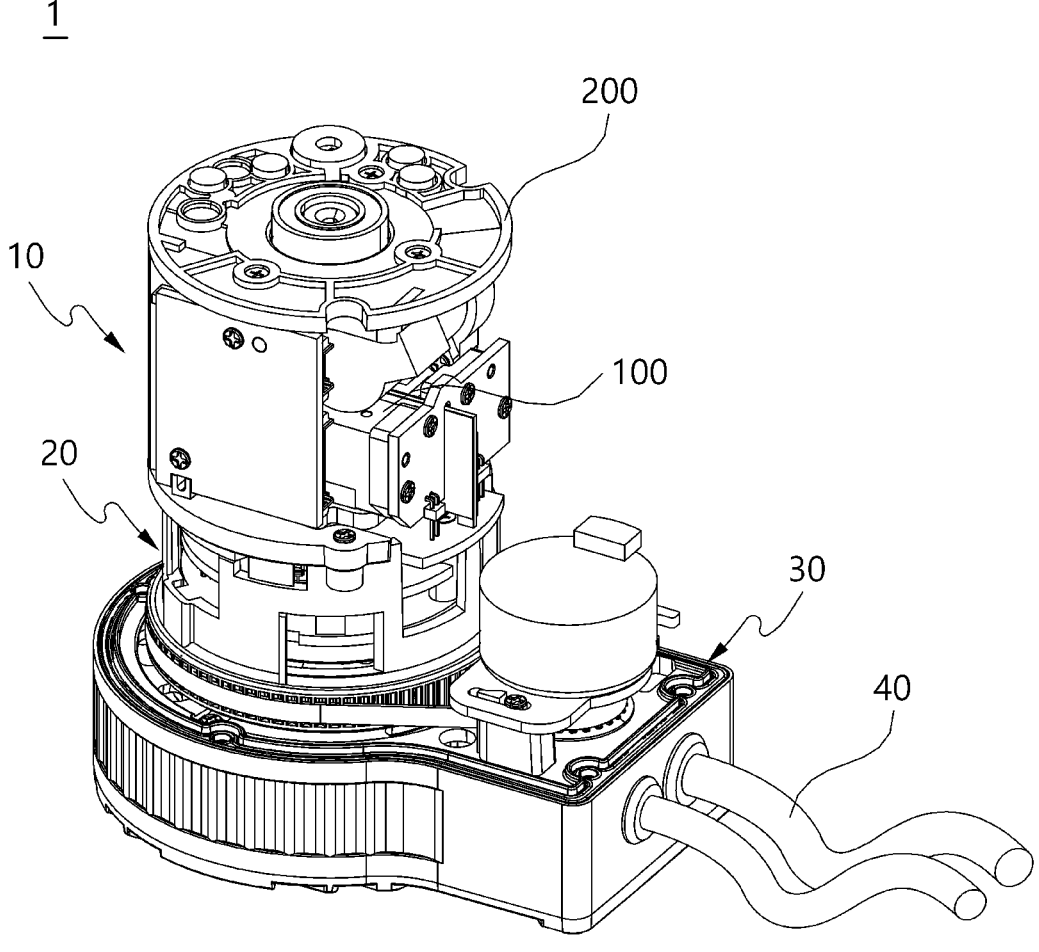
FIGS. 1 and 2 are views illustrating an internal configuration of a LIDAR sensor according to an exemplary embodiment of the present disclosure.

Hereinafter, embodiments of the present invention will be described in detail with reference to the accompanying drawings. Advantages and features of the present disclosure, and methods for accomplishing the same will be more clearly understood from exemplary embodiments described below with reference to the accompanying drawings. However, the present disclosure is not limited to the following exemplary embodiments but may be implemented in various different forms. The exemplary embodiments are provided only to complete disclosure of the present disclosure and to fully provide a person having ordinary skill in the art to which the present disclosure pertains with the category of the invention, and the present disclosure will be defined by the appended claims. Like reference numerals generally denote like elements throughout the specification.

Unless otherwise defined, all terms (including technical and scientific terms) used in the present specification may be used as the meaning which may be commonly understood by the person with ordinary skill in the art, to which the present invention belongs. It will be further understood that terms defined in commonly used dictionaries should not be interpreted in an idealized or excessive sense unless expressly and specifically defined.

Terms used in the present application are just used to describe a specific exemplary embodiment and do not intend to limit the present invention and a singular expression may include a plural expression as long as it is not apparently contextually different. In the present application, it should be understood that the term "include" or "have" indicates that a feature, a number, a step, an operation, a component, a part or the combination thoseof described in the specification is present, but do not exclude a possibility of presence or addition of one or more other features, numbers, steps, operations, components, parts or combinations, in advance.

Terms including an ordinary number, such as first and second, are used for describing various constituent elements, but the constituent elements are not limited by the terms. The above terms are used only to distinguish one component from the other component. For example, without departing from the scope of the present invention, a first component may be referred to as a second component, and similarly, a second component may be referred to as a first component. A term of and/or includes combination of a plurality of related elements or any one of the plurality of related elements.

The present disclosure relates to a LIDAR sensor.

The Lidar sensor according to the present exemplary embodiment may be applied to a distance measuring apparatus or a moving object. That is, the LIDAR sensor may be applied to products which require distance measurement, such as small appliances or a moving object such as drones or vehicles. The moving object includes a LIDAR sensor and a moving device. The moving object includes robot cleaners, logistics robots, toy cars, mobile robots for industrial or military purposes.

The LIDAR sensor is a device which transmits a laser signal, measures a returning time of the reflected signal, and measures a distance to a reflector using a speed of light. The laser signal is converted into an electrical signal by a photo diode. The laser signal may have a predetermined wavelength band.

The Lidar sensor may operate by a time of flight (TOF) manner to measure a distance. According to the time of flight manner, a laser emits a pulsed or square wave signal to measure a time when reflection pulses or square wave signals from objects within a measurement range reach a receiver to measure a distance between an object to be measured and the distance measuring device.

When the distance is measured, the LIDAR sensor 1 calculates a position of an object on a 3D space by means of a distance value, a horizontal angle, and a vertical angle and when the LIDAR sensor horizontally rotates at a high speed, the sensor is used to form a fine angular resolution by means of a contrast of a light reflectance of a target object.

Figure 2:
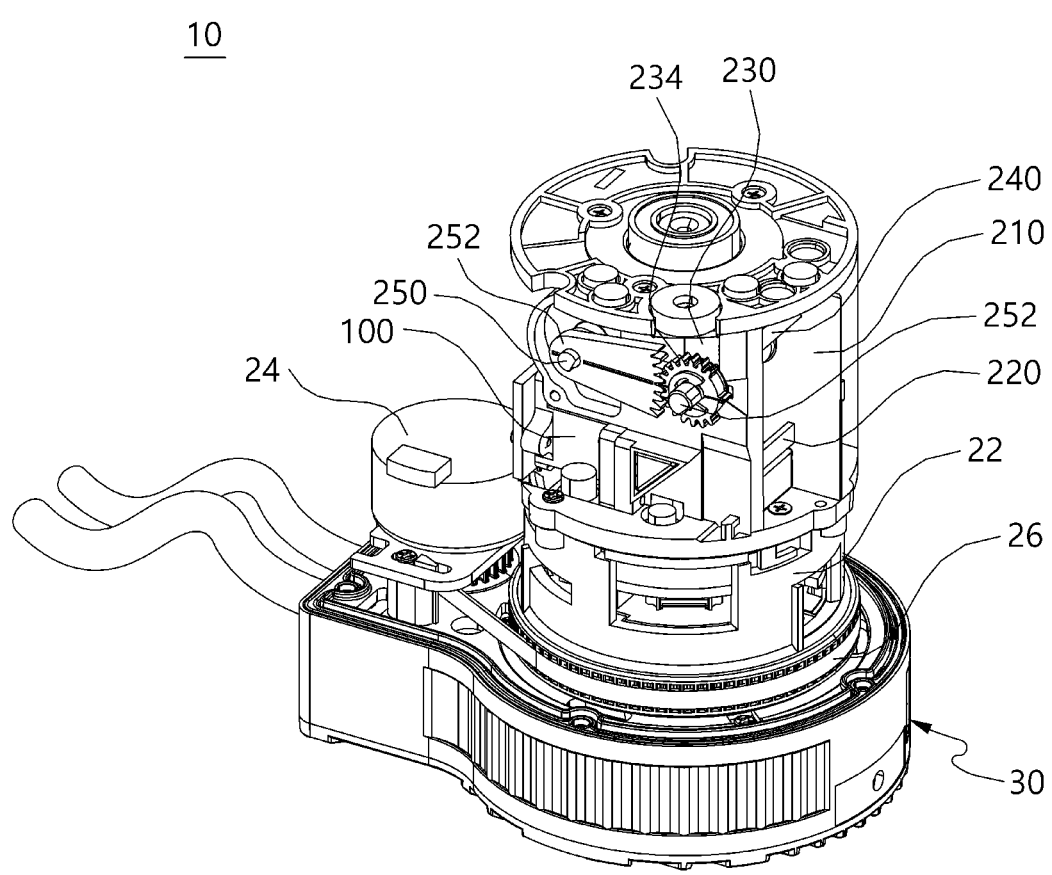

FIGS. 1 and 2 are views illustrating an internal configuration of a LIDAR sensor according to an exemplary embodiment of the present disclosure.

Referring to FIGS. 1 and 2, the LIDAR sensor 1 includes a light transceiver 10, a rotary module assembly 20, and a fixing module 30. The LIDAR sensor 1 may omit some components among various components which are exemplarily illustrated in FIGS. 1 and 2 or may additionally include other component.

The light transceiver 10 transmits transmission light and receives reception light reflected from an object and removes transmission light or reception light moving in a predetermined direction.

The light transceiver 10 includes a transmission/reception module 100 and a reflector assembly 200.

The transmission/reception module 100 transmits transmission light by means of a light source and receives reception light reflected from an object.

The transmission/reception module 100 includes a first body tube 110, a second body tube 120, a circuit board 130, a baffle 140, and a shielding assembly unit 150.

The first body tube 110 provides a path through which the transmission light moves and includes a transmission lens 112 assembled on a front surface.

The transmission lens 112 may be implemented as a longitudinal magnification lens, but is not necessarily limited thereto.

The second body tube 120 is disposed to be spaced apart from one side surface of the first body tube 110, provides a path through which the reception light moves, and a reception lens 122 may be assembled on a front surface thereof.

The reception lens 122 may be implemented as a transverse magnification lens, but is not necessarily limited thereto.

The second body tube 120 may further include an absorber (not illustrated).

The absorber may be formed in a groove formed between the baffle 140 and the lens assembled on the front surface.

The absorber may absorb light moving in a direction where the absorber is formed, among received light.

According to still another exemplary embodiment of the present disclosure, the absorber may be applied not only to the second body tube 120, but also to the first body tube 110.

The circuit board 130 is assembled on rear surfaces of the first body tube 110 and the second body tube 120 and transmits transmission light and receives reception light to acquire distance information to the object.

The baffle 140 is assembled on one side surfaces of the first body tube 110 and the second body tube 120 and cancels noises caused by the transmission light and the reception light.

The baffle 140 includes a light transmission baffle 141 and a light reception baffle 145.

The baffle 140 is slidably assembled in assembly grooves formed on lower side surfaces of the first body tube 110 and the second body tube 120.

The light transmission baffle 141 is assembled on the first body tube 110 and has at least one groove through which the transmission light passes.

The light transmission baffle 141 includes a first light transmission assembly unit 142 and a second light transmission assembly unit 144.

The first light transmission assembly unit 142 includes a first light transmission groove.

The second light transmission assembly unit 144 includes a second light transmission groove.

The first light transmission groove and the second light transmission groove may be implement to form an inclination as a diameter is increased toward the transmission lens so that the transmission light moves only in a predetermined direction. The first transmission groove is formed to be rounded or inclined by obliquely chamfering an edge or a corner.

The light transmission baffle 141 may be assembled on the first body tube 110 so that the first light transmission assembly unit 142 is disposed on the front of the second light transmission assembly unit 144.

The first light transmission groove may be formed to have a larger size than the second light transmission groove.

The light reception baffle 145 is assembled on the second body tube 120 and has at least one groove through which the reception light passes.

The light reception baffle 145 includes a light reception assembly unit 146 and a bandpass filter 148.

The light reception assembly unit 146 may include a light reception groove.

The light reception groove may be implemented to form an inclination as the diameter is increased toward the reception lens 122 so that the reception light moves only in the predetermined direction.

The light reception assembly unit 146 is designed to have a predetermined size according to a light reception range of the reception light and a step-shaped inclination is formed in a direction where the circuit board 130 is provided or the light reception lens is provided with respect to the light reception groove formed to be spaced apart from the circuit board 130. At this time, a distance between the light reception groove and the circuit board 130 may be 7 mm to 9 mm.

According to the exemplary embodiment of the present disclosure, an inclined surface may be implemented such that a diameter is increased toward a direction where the circuit board 130 is provided with respect to the light reception groove, a diameter is increased toward a direction where the light reception lens is provided, and a descending step-shaped inclination may be implemented. At this time, the received reception light may pass through the light reception groove along the step shaped inclination to be transmitted to the circuit board 130.

The bandpass filter 148 is assembled on the second body tube 120 to be spaced apart from at a rear end of the light reception assembly unit 146 and passes only reception light having a predetermined frequency component.

The shielding assembly unit 150 is assembled between the first body tube 110 and the second body tube 120 and restricts the movement of the transmission light which passes through the first body tube 110 to the second body tube 120 and the movement of the reception light which passes through the second body tube 120 to the first body tube 110.

The shielding assembly unit 150 includes a first shielding unit 152, a second shielding unit 154, and a separation unit 156.

The shielding assembly unit 150 is assembled in a first shielding assembly groove formed between opposite side surfaces of the first body tube 110 and the second body tube 120 to be fixed.

The first shielding unit 152 is assembled to abut with one side of the first body tube 110 and absorbs the transmission light emitted to the outside of the first body tube 110.

The first shielding unit 152 includes a first cut portion formed on the front surface by partially cutting one side end provided with a lens and a first protruding portion partially protruding from one side end provided with the circuit board 130. Here, when the first shielding unit 152 is assembled in the first shielding assembly groove 151, the first shielding unit 152 is assembled at a lower end of a connection line to which the first body tube 110 and the second body tube 120 are connected by means of the first cut portion to be fixed.

The second shielding unit 154 is assembled to abut with one side of the second body tube 120 and absorbs the reception light emitted to the outside of the second body tube 120.

The second shielding unit 154 includes a second cut portion formed on the front surface by partially cutting one side end provided with a lens, a third cut portion formed by partially cutting one side end provided with the circuit board, and a second protruding portion partially protruding from an opposite side end of the third cutting portion provided with the circuit board. When the second shielding unit 154 is assembled in the first shielding assembly groove 151, the second shielding unit 154 is assembled at a lower end of a connection line to which the first body tube 110 and the second body tube 120 are connected by means of the second cut portion to be fixed.

The first shielding unit 152 and the second shielding unit 154 are implemented by sheets which block electromagnetic interference (EMI) and light. For example, the first shielding unit 152 and the second shielding unit 154 may be implemented by a ferrite sheet, but are not necessarily limited thereto.

The separation unit 156 is provided between the first shielding unit 152 and the second shielding unit 154 to separate the first shielding unit 152 and the second shielding unit 154 from each other.

The separation unit includes a fourth cut portion formed on the front surface by partially cutting one side end provided with a lens, a third protruding portion partially protruding from one side end provided with the circuit board 130, and a fourth protruding portion partially protruding from the third protruding portion toward the protruding direction of the third protruding portion. When the separation unit 156 is assembled in the first shielding assembly groove 151, the separation unit 154 is assembled at a lower end of the connection line to which the first body tube 110 and the second body tube 120 are connected by means of the fourth cut portion to be fixed. The fourth protruding portion may be fixed to abut with the rotary module assembly 20.

The separation unit 156 includes an upper soldering unit 158 and a lower soldering unit 159.

When the upper soldering unit 158 is assembled to abut with the second shielding unit, the upper soldering unit 158 is formed to be partially exposed toward a direction in which the second body tube 120 is provided at an upper end by the third cut portion of the second shielding unit 154.

When the separation unit 156 and the first shielding unit 152 and the second shielding unit 154 are assembled to partially abut with each other, the lower soldering unit 159 transmits the transmission light or the reception light to a ground unit of the circuit board 130 by means of the fourth protruding portion.

The upper soldering unit 158 and the lower soldering unit 159 shield the transmission light or the reception light which concentrically radiates at lower ends.

When the separation unit 156 is assembled with the circuit board 130, the separation unit 156 is assembled to be fixed such that the upper soldering unit 158 and the lower soldering unit 159 pass through the circuit board to outwardly protrude.

For example, the separation unit 156 is implemented by an insulator which supports and fixes the first shielding unit 152 and the second shielding unit 154, but is not necessarily limited thereto.

The lower soldering unit 159 may be fixed to the rotary module assembly 20 by means of a portion downwardly protruding to separate the transmission/reception module 100 from the rotary module assembly 20.

The reflector assembly 200 forms an empty space to assemble the transmission/reception module 100 at one side, receives the transmission light from the transmission/reception module 100 to reflect the transmission light toward the object and transmits the reception light reflected from the object to the transmission/reception module 100.

The reflector assembly 200 includes a mirror housing 210, a first reflection unit 220, a mirror holder unit 230, and a second reflection unit 240.

The mirror housing 210 may be assembled at one lower side of the transmission/reception module 100.

The first reflection unit 220 may be provided in a position corresponding to the transmission/reception module 100 at one lower side of the mirror housing 210.

The first reflection unit 220 receives the transmission light by means of the transmission/reception module 100 to transmit the transmission light to the second reflection unit 240 and receives the reception light by means of the second reflection light 240 to transmit the reception light to the transmission/reception module 100.

The mirror holder unit 230 is assembled in an assembly groove formed at an upper end of the mirror housing 210 to be fixed to the mirror housing 210.

The mirror holder unit 230 includes a bearing 232, a second gear 234, and a fixing ring 236.

The bearing 232 is assembled on both ends of the mirror holder unit 230 in a state in which the mirror holder unit 230 is assembled in the assembly groove of the mirror housing 210 to be assembled and fixed to the mirror housing 210.

The second gear 234 may be assembled and fixed to the outside of the bearing.

The fixing ring 236 is assembled to abut with the outside of the second gear 234 to fix the second gear 234.

The second gear 234 and the fixing ring 236 may be assembled only at an end of one of the bearings 232 assembled to both ends to be fixed.

The second reflection unit 240 is fixed to one side surface of the mirror holder unit 230 to rotate by the operation of the mirror holder unit 230 and reflects the transmission light toward the object and receives the reception light reflected from the object.

The reflector assembly 200 further includes a mirror driving unit 250.

The mirror driving unit 250 provides a rotary driving force to the mirror holder unit 230 to adjust a reflection direction of a second reflection unit 240.

The mirror driving unit 250 includes a first gear 252 connected to the second gear 234 and provides a rotary driving force to the mirror holder unit 230 by means of the first gear 252 to rotate the second reflection unit 240 fixed to the mirror holder unit 230.

The first gear 252 limits the angle range at which the mirror holder unit 230 rotates as it rotates in a first direction or a second direction within a predetermined angle range.

A rotation axis of the mirror driving unit 250 and a rotation axis of the mirror holder unit 230 are assembled in the mirror housing 210 to correspond to each other.

The rotary module assembly 20 is connected to the lower portion of the light transceiver 10 and generates a torque to be rotatably implemented.

The fixing module 30 supports the transmission/reception module 100, the reflector assembly 200, and the rotary module assembly 20.

Referring to FIG. 1, the cable 40 is connected at one side surface of the fixing module 30. The cable 40 includes an MCU and WPT TX part and is implemented to supply the power to the upper part by a motor driving function and other function and wireless power function. Further, the cable 40 transmits space measurement information (range, intensity, horizontal/vertical angle) of the LIDAR sensor 1 to the outside via the Ethernet communication.

Figure 3:
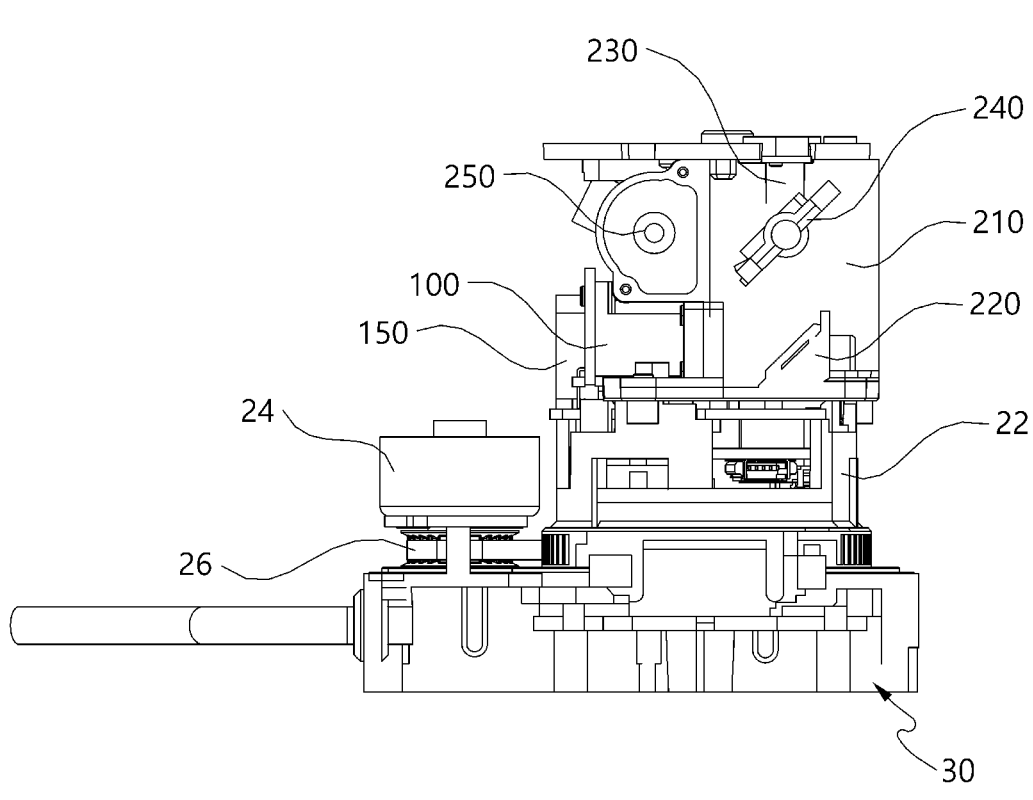
FIG. 3 is a view illustrating a cross-section of a LIDAR sensor according to an exemplary embodiment of the present disclosure.

FIG. 3 is a view illustrating a cross-section of a LIDAR sensor according to an exemplary embodiment of the present disclosure.

The LIDAR sensor 1 includes a light transceiver 10 provided above a rotary module assembly 20 and the fixing module 30 provided at a lower end to perform the operation.

Referring to FIG. 3, the rotary module assembly 20 includes a rotary unit 22, a rotary driving unit 24, and a rotary connection unit 26.

The rotary unit 22 rotates with the light transceiver 10 attached thereto.

The rotary module assembly 20 transmits a rotary driving force generated by the rotary driving unit 24 to the rotary unit 22 by means of the rotary connection unit 26 to rotate the rotary unit 22.

According to the exemplary embodiment of the present disclosure, the rotary connection unit 26 may be used to transmit the rotary driving force at a predetermined rotation ratio.

The LIDAR sensor 1 rotates the rotary driving unit 24 to rotate a pulley and a belt 26 is supplied with a power by means of the pulley to rotate the rotary module assembly 20.

The rotary driving unit 24 is connected to the rotary unit 22 by means of the rotary connection unit 26 to transmit a power to rotate the rotary unit 22. Specifically, referring to FIG. 5, the rotary driving unit 24 is connected to the rotary frame 2300 by means of the rotary connection unit 26 to transmit a power, but is not necessarily limited thereto.

The fixing module 30 supports the light transceiver 10 and the rotary module assembly 20.

The transmission/reception module 100 may be fixed in a location spaced apart from the reflector assembly 200 with a predetermined distance. For example, the transmission/reception module 100 is assembled in an empty space on one lower side surface of the reflector assembly 200 and at least partially abuts or does not abut. Specifically, the transmission/reception module 100 may be implemented in a location to interact with the first reflection unit 220 of the reflector assembly 200 by means of the transmission light or the reception light.

Referring to FIG. 3, the transmission/reception module 100 is located in a location corresponding to the first reflection unit 220 of the reflector assembly 200 to transmit the transmission light to the first reflection unit 220 and receive the reception light transmitted to the first reflection unit 220.

The second reflection unit 240 may be provided in the corresponding location to interact with the first reflection unit 220. For example, the second reflection unit 240 is located in a location to receive the transmission light reflected from the first reflection unit 220 and to reflect the light toward the object.

Referring to FIG. 3, the second reflection unit 240 may be fixed in a location spaced apart from the upper end of the first reflection unit 220 and may be implemented to control the direction.

According to an exemplary embodiment of the present disclosure, the second reflection unit 240 may be provided in one line with the mirror driving unit 250. Specifically, an axis center of the mirror holder unit 230 to which the second reflection unit 240 is fixed and an axis center of the mirror driving unit 250 are implemented to be located on one line, but are not necessarily limited thereto.

The mirror driving unit 250 may be connected to the mirror holder unit 230 by means of the first gear 252. Specifically, the first gear 252 may be assembled to abut with the second gear 234 assembled in the mirror holder unit 230 and rotates by the mirror driving unit 250 to rotate the second gear 234. Accordingly, the mirror holder unit 230 rotates to rotate the second reflection unit 240 fixed to the mirror holder unit 230.

According to an exemplary embodiment of the present disclosure, the first gear 252 may rotate in a first direction or a second direction with a predetermined angle range by the mirror driving unit 250 and also rotates an engaged second gear 234 in the first direction or the second direction. By doing this, the second reflection unit 240 may rotate in the first direction or the second direction within the predetermined angle direction. Here, the predetermined angle may be determined according to a tooth ratio of the first gear 252 and the second gear 234. The number of teeth of the first gear 252 and the number of teeth of the second gear 234 are set to M to N (here, M and N are natural numbers) to adjust a movement speed of the second reflection unit 240 assembled in the mirror holder unit 230 according to a rotation speed of the mirror driving unit 250.

In the reflector assembly 200, as the mirror driving unit 250 rotates, the mirror holder unit 230 rotates. At this time, the mirror driving unit 250 and the mirror holder unit 230 may vertically rotate, but are not necessarily limited thereto.

Accordingly, the LIDAR sensor 1 allows light which is not vertically transmitted/received to go out from the first body tube 110 and the second body tube 120 so that finally, the reception light is not contaminated.

Figure 4:
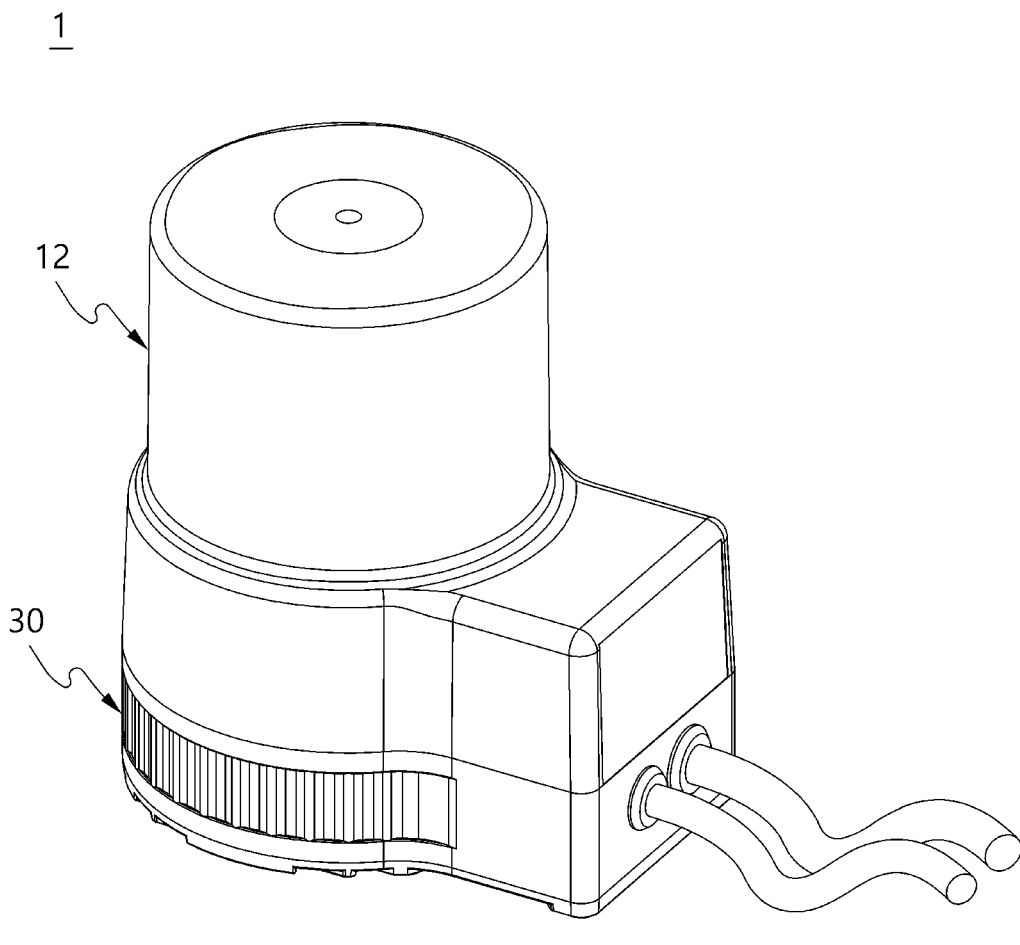
FIG. 4 is a view illustrating an external shape of a LIDAR sensor according to an exemplary embodiment of the present disclosure.

FIG. 4 is a view illustrating an external shape of a LIDAR sensor according to an exemplary embodiment of the present disclosure.

Referring to FIG. 4, the LIDAR sensor 1 further includes a protection housing 12 to protect the light transceiver 10 and the rotary module assembly 20 from the outside.

The protection housing 12 may be implemented to enclose the light transceiver 10 and the rotary module assembly 20 to be provided inside at an upper end of the fixing module 30, but is not necessarily limited thereto.

Figure 5:
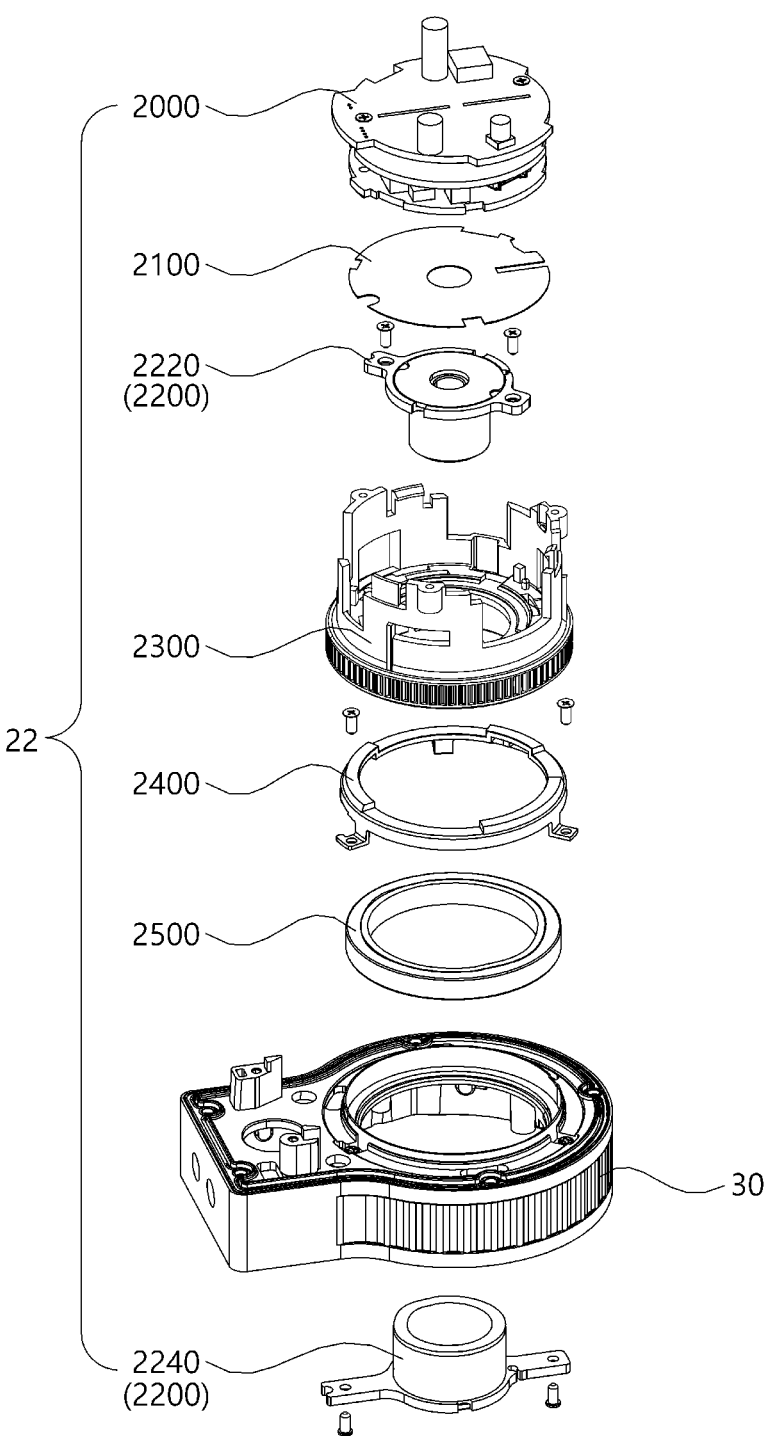
FIG. 5 is a view illustrating a rotary module assembly and a fixing module according to an exemplary embodiment of the present disclosure.

FIG. 5 is a view illustrating a rotary module assembly and a fixing module according to an exemplary embodiment of the present disclosure.

The rotary module assembly 20 rotates the transmission/reception module 100 and acquires an angular resolution based on an RPM and a rotation angle calculated by recognizing a difference in the light reception amount.

The angular resolution indicates a minimum angular difference obtained by a radar which discriminates two targets when two targets located in the same distance gradually approaches.

FIG. 5 illustrates an exploded view obtained by exploding a rotary unit 22 and a fixing module 30 of a rotary module assembly 20.

Referring to FIG. 5, the rotary unit 22 includes a substrate assembly 2000, a reception sheet 2100, a power transmission assembly 2200, a rotary frame 2300, a slit fixing unit 2400, and a bearing 2500.

The substrate assembly 2000 is implemented by at least one layer so that the transmission/reception module 100 is assembled on one side and a sensor unit 2062 is fixed to a side surface opposite to the side on which the transmission/reception module 100 is assembled.

The substrate assembly 2000 includes a first substrate 2020, a second substrate 2040, and a third substrate 2060.

The first substrate 2020 may include at least one assembly protruding portion to assemble the transmission/reception module.

The second substrate 2040 may be laminated on the first substrate.

The second substrate 2040 further includes a transceiver which bi-directionally transmits and receives data.

The second substrate 2040 may be implemented to shield interference of transmission light and the reception light and light which is transmitted/received by the sensor unit 2063.

The third substrate 2060 is laminated on the second substrate 2040 and receives power from the power transmission assembly 2200.

The substrate assembly 2000 acquires an angular resolution based on the RPM and the rotation angle of the rotary module assembly 20 which are calculated using a light reception amount reflected by a boundary of at least one slit 2440 or the fixing unit 2420.

The reception sheet 2100 may be assembled to be spaced apart from a side surface of the substrate assembly 2000 to which the sensor unit 2062 is fixed.

The power transmission assembly 2200 may be assembled to be connected by passing through a hole formed in the rotary frame 2300 and the slit fixing unit 2400.

The power transmission assembly 2200 includes a power reception unit 2220 and a power transmission unit 2240.

The power reception unit 2200 is assembled to pass through the inside of the rotary frame 2300 to be fixed and receives a power to transmit the power to the substrate assembly 2000.

The power transmission unit 2240 is assembled with the power reception unit 2220 by passing through the inside of the rotary frame 2300 and transmits the power to the power reception unit 2220.

The rotary frame 2300 is fixed to at least partially abut with the fixing module 30 and the substrate assembly 2000 and the reception sheet 2100 are assembled therein to rotate.

The slit fixing unit 2400 is at least partially introduced in the rotary frame 2300 to be fixed so as to correspond to the sensor unit 2062.

The slit fixing unit 2400 includes a fixing unit 2420 and a slit 2440.

The slit fixing unit 2400 is fixed to an upper end of the fixing module 30 and the rotary frame 2300 may be rotatably implemented. At this time, the rotary frame 2300 rotates by a belt structure.

The fixing unit 2420 is fixed to the fixing module 30.

The slit 2440 is assembled on one side surface of the fixing unit 2420 and reflects light transmitted by the sensor unit 2062. At least one slit 2440 may be assembled on one side surface of the fixing unit 2420.

When a plurality of slits 2440 is provided, the slits are implemented to have the same area or different area to form a constant interval along one side surface of the fixing unit 2420.

The slit 2440 is assembled to form a step with the fixing unit 2420 to calculate a rotation angle and an RPM of the rotary module assembly 20 based on a boundary according to the step with the fixing unit 2420.

The bearing 2500 fixes a central axis of the rotary module assembly 20 and supports a dead weight of the central axis and a load applied to the central axis.

The bearing 2500 is provided between the slit fixing unit 2400 and the rotary frame 2300.

Figure 6:
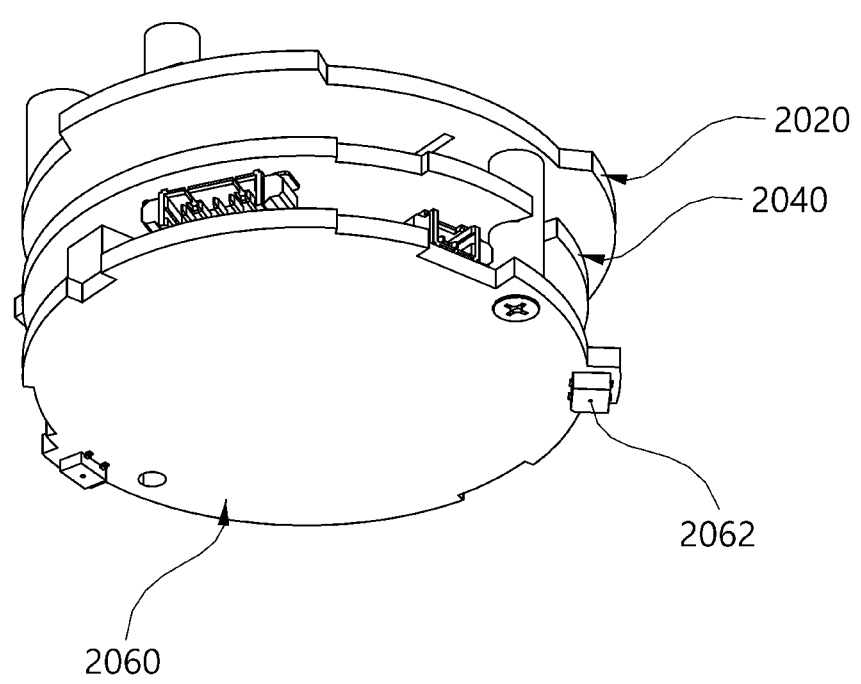
FIG. 6 is a view illustrating a substrate assembly of a rotary module assembly according to an exemplary embodiment of the present disclosure.

FIG. 6 is a view illustrating a substrate assembly of a rotary module assembly according to an exemplary embodiment of the present disclosure.

Referring to FIG. 6, the substrate assembly 2000 includes a first substrate 2020, a second substrate 2040, and a third substrate 2060.

The transmission/reception module 100 may be assembled on an upper surface of the first substrate 2020. For example, on the first substrate 2020, components such as SRA or jT are assembled on the upper edge and the transmission/reception module 100 is assembled therebetween.

Specifically, on the first substrate 2020, a plurality of circular holes may be formed to assemble and fix the ground 138 of the circuit board 130 and a longitudinal groove may be formed between an upper side surface on which the first body tube 110 of the transmission/reception module 100 is provided and an upper side surface on which the second body tube 120 is provided, with respect to the second shielding assembly groove 138 formed on the circuit board 130. Here, the longitudinal groove may be formed with a width corresponding to a distance between the first body tube 110 and the second body tube 120, but is not necessarily limited thereto.

According to the exemplary embodiment of the present disclosure, the first substrate 2020 may be implemented by an Amp board, but is not necessarily limited thereto. Specifically, the first substrate 2020 receives laser diode high speed pulsing and a laser signal and then amplifies a minute signal to transmit the signal to a time-to-digital converter (TDC).

The first substrate 2020 includes at least two fixing grooves to be assembled and fixed to the second substrate 2040 and the third substrate 2060.

The second substrate 2040 may be assembled between the first substrate 2020 and the third substrate 2060.

The second substrate 2040 includes at least two fixing grooves to be assembled and fixed to the first substrate 2020 and the third substrate 2060. At this time, even though it is illustrated that the fixing groove formed on the second substrate 2040 is formed to be partially outwardly open, it is not necessarily limited thereto.

According to the exemplary embodiment of the present disclosure, the second substrate 2040 may be implemented by an MCU board, but is not necessarily limited thereto. Specifically, the second substrate 2040 may control all the functions of upper parts (a laser diode, a photodiode, and a step motor) and the TDC may transmits a time of flight (ToF) of light and an intensity of returned light to the MCU. The second substrate 2040 may calculate a distance value based on the time of flight of light and the intensity of the returned light. Here, the upper parts refer to the transmission/reception module 100 and the reflector assembly 200.

The third substrate 2060 includes at least two fixing grooves to be assembled and fixed to the first substrate 2020 and the second substrate 2040.

According to the exemplary embodiment of the present disclosure, the third substrate 2060 may be implemented by a WPT board, but is not necessarily limited thereto. Specifically, the third substrate 2060 may be supplied with a wireless power. For example, the third substrate 2060 may generate 3.3 V, 5 V, and 30 V, but is not necessarily limited thereto.

The fixing grooves of the first substrate 2020, the second substrate 2040, and the third substrate 2060 may be formed in corresponding positions and screwed on both sides of the first substrate 2020 and the third substrate 2060 to be fixed.

The sensor unit 2062 may be fixed to one side end of the third substrate 2060.

According to the exemplary embodiment of the present disclosure, the sensor unit 2062 may be implemented by a photointerruptor sensor, but is not necessarily limited thereto. The photointerruptor sensor disposes a light emitting element and a light receiving element to be opposite to each other in one package and detects the presence of an object by a phenomenon that light is blocked when a detection object passes between the light emitting element and the light receiving element.

Figure 7A:
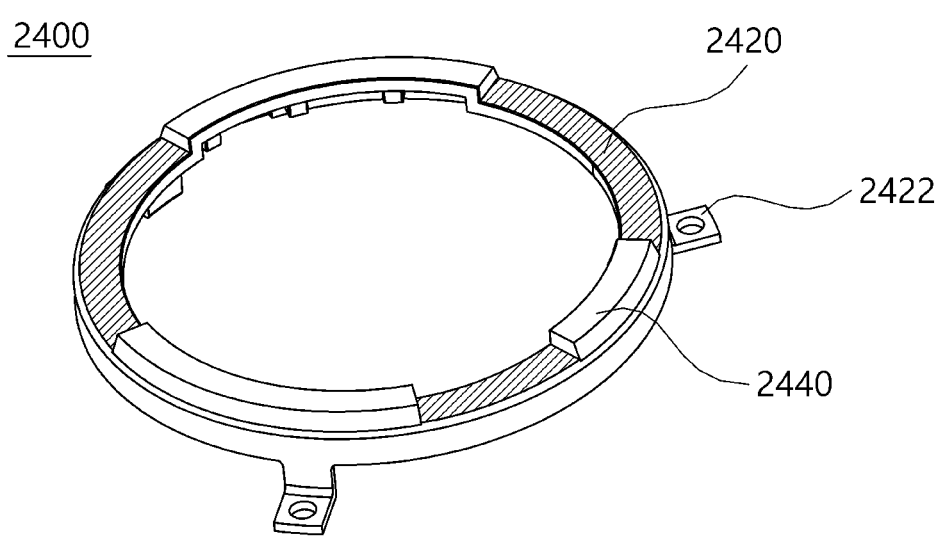
FIG. 7A and FIG. 7B are a view illustrating a slit fixing unit of a rotary module assembly according to an exemplary embodiment of the present disclosure.
Figure 7B:
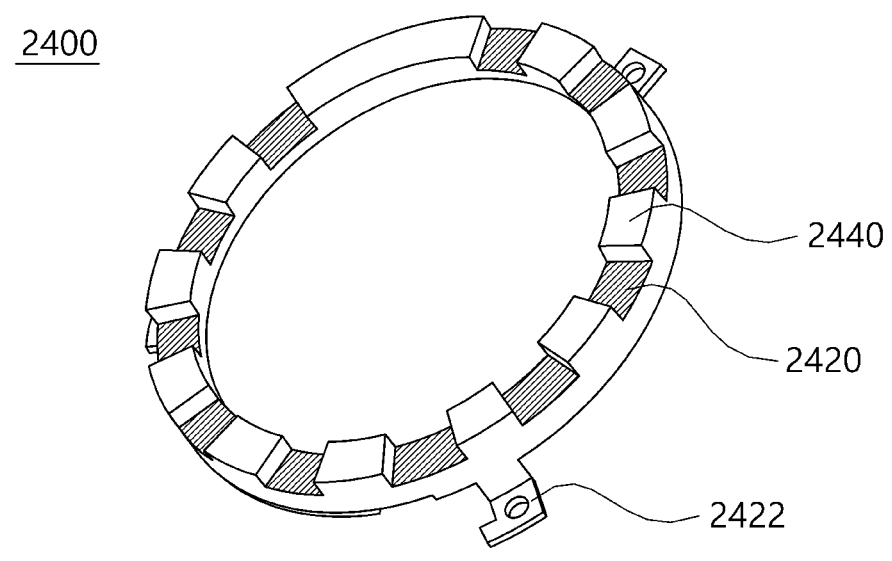

FIG. 7 is a view illustrating a slit fixing unit of a rotary module assembly according to an exemplary embodiment of the present disclosure.

Referring to FIG. 7, the slit fixing unit 2400 includes a fixing unit 2420 and a slit 2440.

Specifically, the slit fixing unit 2400 may be implemented such that a plurality of slits 2440 is assembled at an upper end of the fixing unit 2420. At this time, when a plurality of slits 2440 is assembled, the intervals and the areas may be implemented to be equal to each other, or implemented to be different from each other. Accordingly, the shape of the slit 2440 may be implemented to be modified as needed.

According to the exemplary embodiment of the present disclosure, the slit 2440 may be formed by white and the fixing unit 2420 may be formed by black, but are not necessarily limited thereto.

The slit 2440 is assembled along an upper end of the fixing unit 2420 and forms a predetermined height. Accordingly, the slit fixing unit 2400 may be implemented to calculate the RPM and a detailed angle based on the different intervals, heights, and a color difference of the slit 2440 and the fixing unit 2420.

Specifically, the RPM may be calculated based on the number of slits 2440 reflected from the sensor unit 2062 and the detailed angle may be calculated based on a boundary of the slit 2440 and the fixing unit 2420.

Accordingly, as the fixing unit 2420 and the slit 2440 form different heights, the slit fixing unit 2400 may derive an effect of reducing an error rate.

Figure 8:
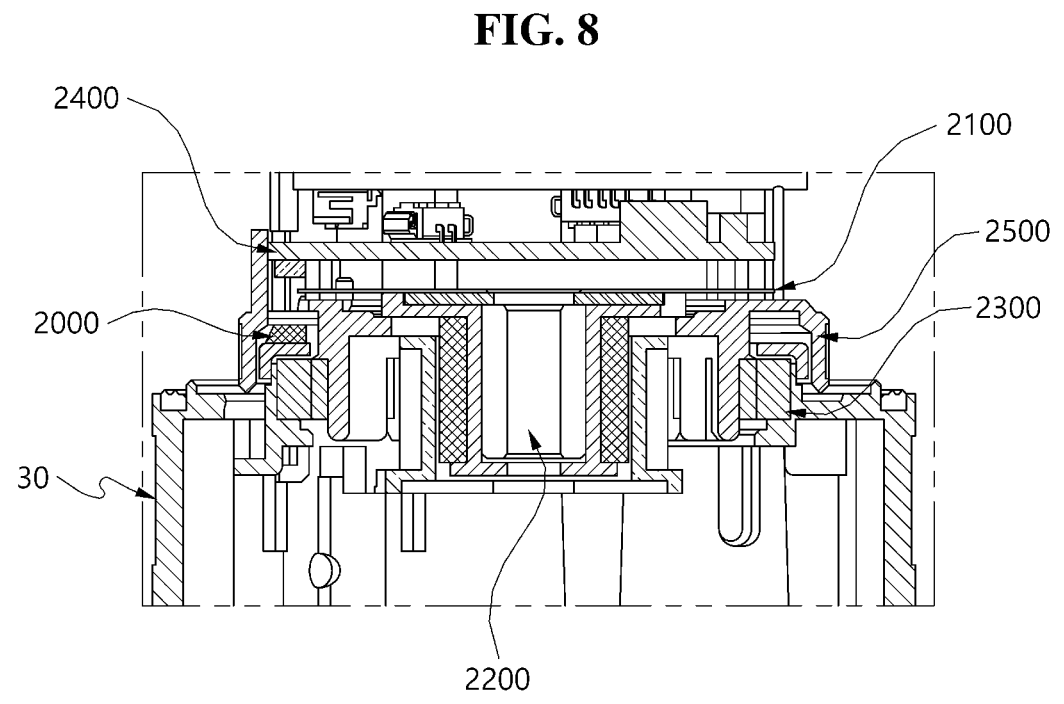

FIG. 8 is a view illustrating a cross-section of a rotary module assembly according to an exemplary embodiment of the present disclosure.

Referring to FIG. 8, the rotary module assembly 20 may be assembled on an upper end of the fixing module 30, but is not necessarily limited thereto.

The sensor unit 2062 fixed to the third substrate 2060 of the substrate assembly 2000 may be assembled in a position corresponding to the slit fixing unit 2400.

The power transmission assembly 2200 is fixed to the upper end of the fixing module and is fixed to pass through a part of the rotary frame 2300, but is not necessarily limited thereto.

The reception sheet 2100 may be assembled to be spaced apart from a side surface of the substrate assembly 2000 to which the sensor unit 2062 is fixed.

Figure 9:
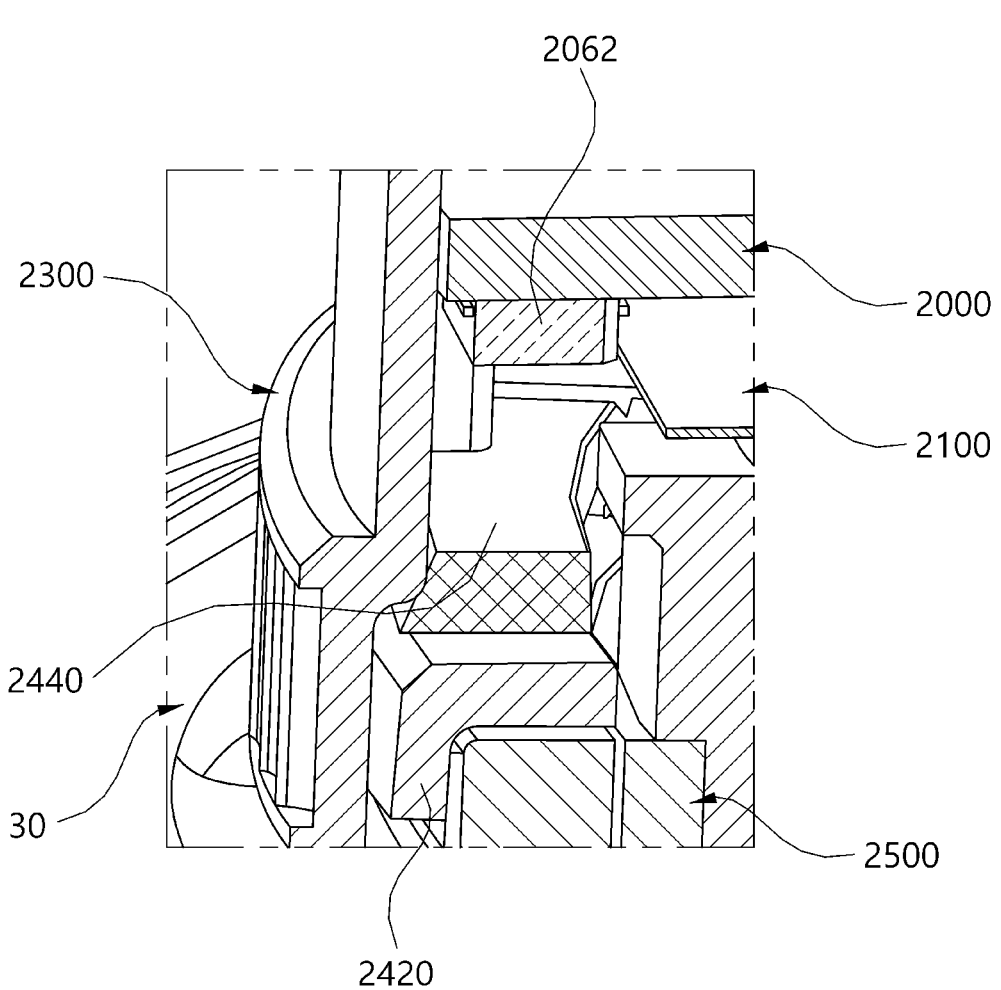
FIG. 9 is a view illustrating an internal assembled shape of a rotary module assembly according to an exemplary embodiment of the present disclosure.

FIG. 9 is a view illustrating an internal assembled shape of a rotary module assembly according to an exemplary embodiment of the present disclosure.

Referring to FIG. 9, when the light transmitted by the sensor unit 2062 is transmitted to the fixing unit 2420 formed by black, the reflection is not performed so that 0 is derived and when the light is transmitted to the slit 2440 formed by white, the reflection is performed so that 1 is derived.

The bearing 2500 is provided between the slit fixing unit 2420 and the rotary frame 2300. Specifically, in the fixing unit 2420, a groove may be outwardly formed therein and the bearing 2500 is assembled in the formed groove to be fixed.

The rotary module assembly 20 may be implemented so that the step difference and the color difference of the fixing unit 2420 and the slit 2440 of the slit fixing unit 2400 is present at a mechanically correct point and the sensor unit 2062 may recognize the difference in light reception amount due to the step difference, the color, and the reflectance.

Accordingly, when the distance is measured, the LIDAR sensor may calculate a position on the 3D space by a distance value, a horizontal angle, and a vertical angle value. During the horizontal rotation at a high speed, the photointerruptor sensor is used to obtain a fine angular resolution by the contrast of the light reflectance of the target object. The intended step difference and the color of the instrument need to be present at the correct mechanical point and the PI sensor may operate to recognize the difference in the light reception amount due to the step/color/reflectance.

The contrast of the light reflectance may be implemented by a mechanical height step difference, the color of the material, and the reflectance. For example, there are 2% reflective sheet and retroreflective sheet. Further, as the slit is increased, the angular resolution is improved within a limit which is mechanically implemented. The light reflection amount is confirmed by the photointerruptor and then applied to correct the angle.

Figure 10:
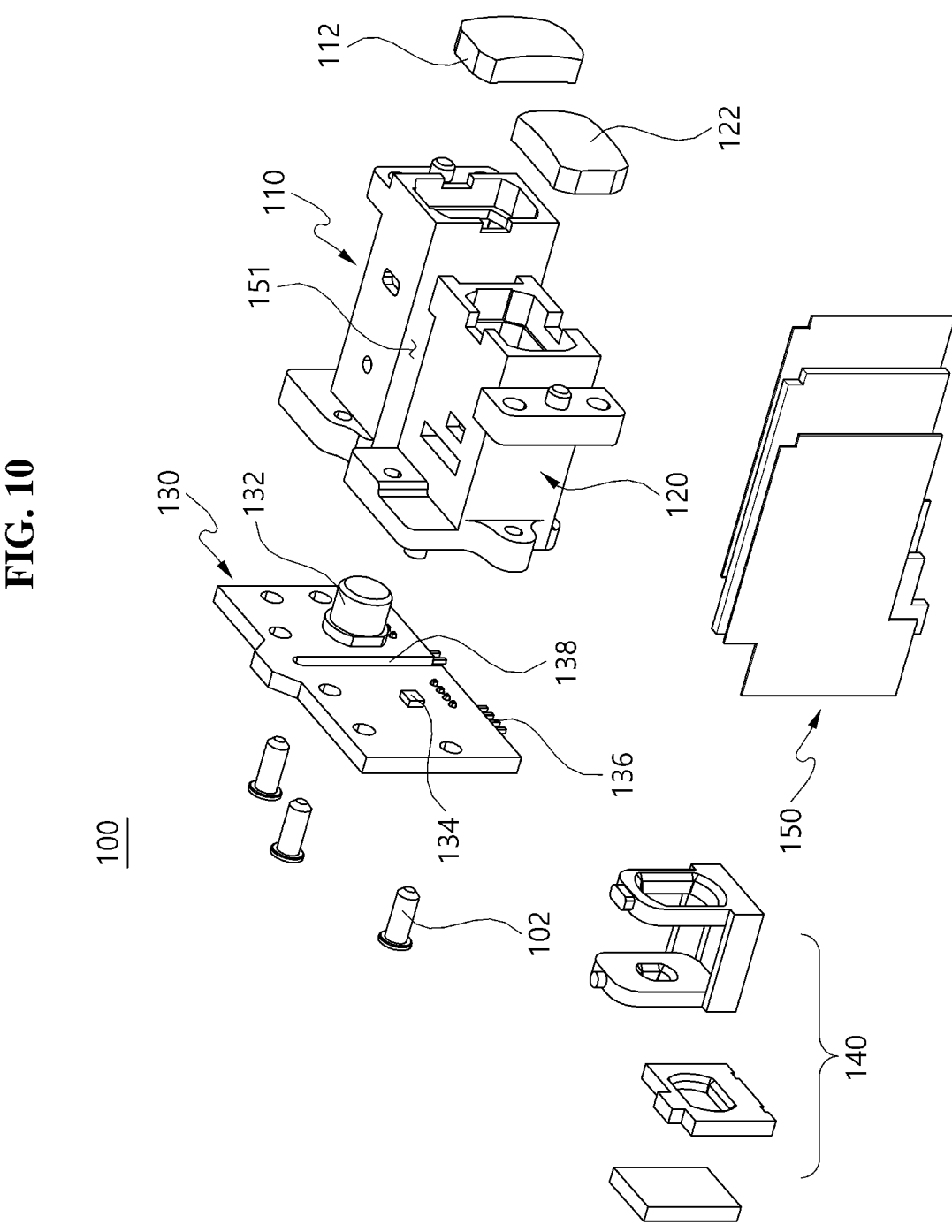
FIG. 10 is a view illustrating a transmission/reception module according to an exemplary embodiment of the present disclosure.

FIG. 10 is a view illustrating a transmission/reception module according to an exemplary embodiment of the present disclosure.

The transmission/reception module 100 of the light transceiver 10 of the LIDAR sensor 1 may be implemented with a body tube structure which removes light which travels in an unwanted place when light is transmitted/received.

According to one exemplary embodiment of the present disclosure, the transmission/reception module 100 includes one first body tube 110 and one second body tube 120, but is not necessarily limited thereto.

The first body tube 110 and the second body tube 120 may be provided in a horizontally corresponding location and lenses are assembled on front surfaces and circuit boards 130 may be assembled on rear surfaces. For example, the first body tube 110 and the second body tube 120 are screwed to be assembled and fixed with the circuit boards 130 by means of a screw 102 and the lenses are assembled in grooves formed on the front surfaces and then bonded to be fixed.

The circuit board 130 may include a light source in a location corresponding to the first body tube 110. The light source transmits transmission light to pass through the first body tube 110 and transmit the light toward the object by means of the reflector assembly 200.

The circuit board 130 receives reception light in a position corresponding to the second body tube 120 to acquire distance information of the object.

According to the exemplary embodiment of the present disclosure, the circuit board 130 may calculate an output of a light source, a pulse repetitive rate, and distance information to the object.

The circuit board 130 may include an emitter 132, a detector 134, a ground 136, and a second shielding assembly groove 138, but is not necessarily limited thereto.

The emitter 132 transmits transmission light and is assembled with the first body tube 110 to transmit the transmission light along a path formed by the first body tube 110.

The detector 134 receives reception light and is assembled with the second body tube 120 to receive the received reception light along a path formed by the second body tube 120.

A plurality of grounds 136 is formed at lower ends of the emitter 132 and the detector 134, but is not necessarily limited thereto.

The second shielding assembly groove 138 may be formed between the emitter 132 and the detector 134, but is not necessarily limited thereto.

The baffle 140 is slidably assembled on lower surfaces of the first body tube 110 and the second body tube to be fixed, but is not necessarily limited thereto.

The baffle 140 is detachably implemented to be separated from the first body tube 110 and the second body tube 120.

The transmission/reception module 100 may be implemented with a structure in which a light transmission lens 112, a light reception lens 122, a circuit board 130, and a baffle 140 are assembled to be fitted into the grooves of the first body tube 110 and the second body tube 120. Specifically, the light transmission lens 112 and the light reception lens 122 are assembled in front grooves of the first body tube 110 and the second body tube 120 and then bonded to be fixed. Further, the circuit board 130 is screwed to be assembled and fixed to the rear surfaces of the first body tube 110 and the second body tube 120.

Accordingly, the transmission/reception module 100 optimizes the position of the baffle 140 to prevent the light reception in an undesired direction and minimizes a size of a hole of the baffle 140 and changes a shape of the baffle 140 to minimize the noise.

There is a problem in that high speed pulsing of a laser diode of the related art causes bias instability of a second body tube and generates a signal noise. Further, when the emitted light is directly leaked to the second body tube, there is a problem in that activation is generated in the second body tube due to unintended light.

Accordingly, the shielding assembly unit 150 of the transmission/reception module 100 of the present disclosure shields the electromagnetic interface caused by the radiation noise of the related art and fundamentally blocks the shape generated by the activation.

The transmission/reception module 100 may remove the radiation noise by means of the shielding assembly unit 150.

The shielding assembly unit 150 may remove the radiation noise by a partition which separates the first body tube 110 from the second body tube 120, the ferrite sheet, and the ground connection.

Further, the shielding assembly unit 150 shields the light leakage by the isolation from the circuit board 130.

Further, the shielding assembly unit 150 may be fixed between the first body tube 110 and the second body tube 120 by the first shielding assembly groove 151 formed between the first body tube 110 and the second body tube 120. At this time, the first shielding assembly groove 151 may be formed with the same width as the width of the shielding assembly unit 150, but is not necessarily limited thereto so that the first shielding assembly groove may be formed to have a width which is equal to or larger than the width of the shielding assembly unit 150.

The circuit board 130 includes a second shielding assembly groove 138 through which the shielding assembly unit 150 passes to be fixed. Here, the second shielding assembly groove 138 may be formed with the same width as the width of the shielding assembly unit 150, but is not necessarily limited thereto so that the second shielding assembly groove may be formed to have a width which is equal to or larger than the width of the shielding assembly unit 150.

Figure 11:
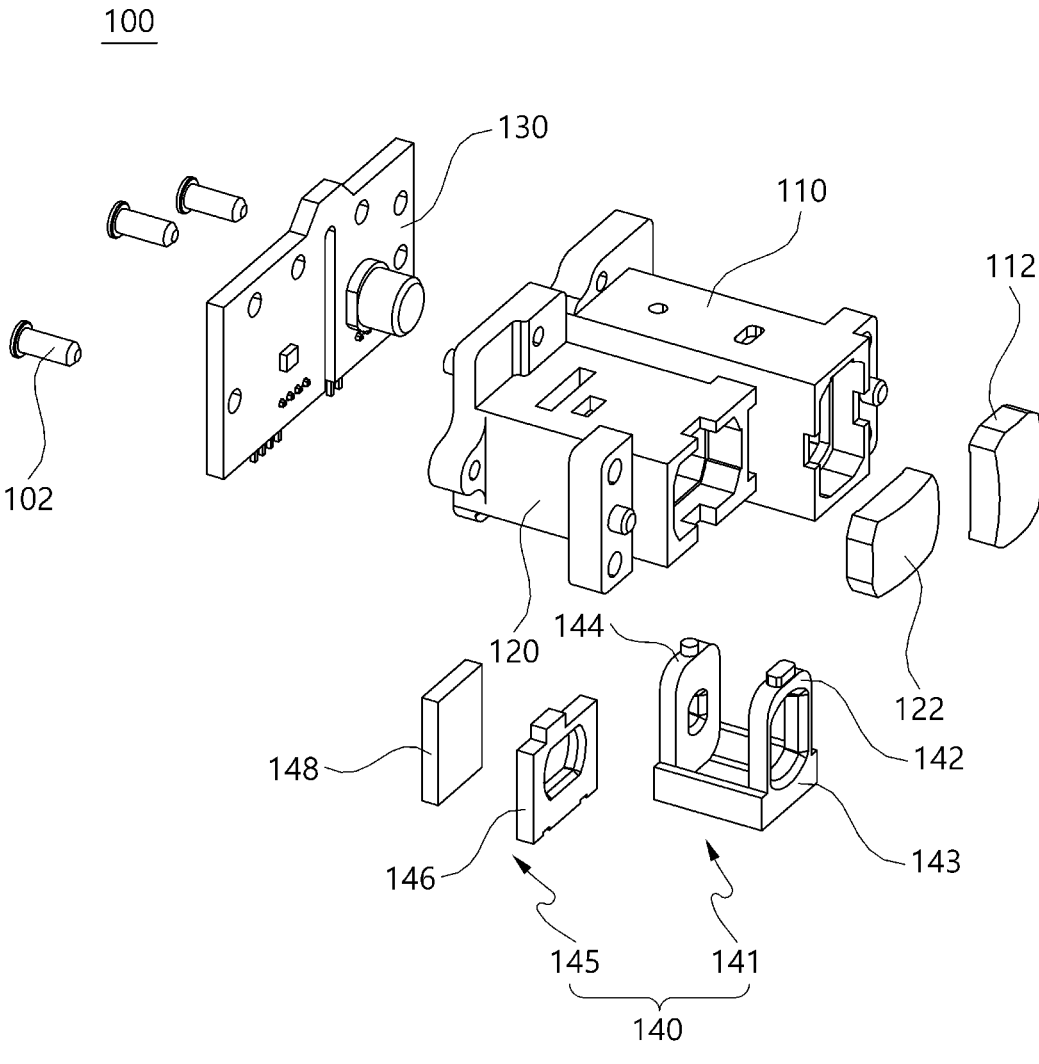
FIG. 11 is a view illustrating a transmission/reception module to which a baffle according to an exemplary embodiment of the present disclosure is applied.

FIG. 11 is a view illustrating a transmission/reception module to which a baffle according to an exemplary embodiment of the present disclosure is applied.

The first body tube 110 and the second body tube 120 include assembly grooves to which the baffle 140 is fixed, on lower surfaces. Specifically, the first body tube 110 includes a light transmission assembly groove and the second body tube 120 includes a first light reception assembly groove and a second light reception assembly groove.

The light transmission assembly groove is a groove to which the light transmission baffle 141 including a light reception assembly unit 146 and the bandpass filter 148 is assembled to be fixed and is formed with the same shape as the outside of the light transmission baffle 141.

The first light reception assembly groove is a groove to which the first light reception assembly unit 146 is assembled to be fixed and is formed with the same shape as the outside of the first light reception assembly unit 146.

The second light reception assembly groove is a groove to which the bandpass filter 148 is assembled to be fixed and is formed with the same shape as the outside of the bandpass filter 148.

The baffle 140 is slidably assembled on lower surfaces of the first body tube 110 and the second body tube to be fixed, but is not necessarily limited thereto.

The baffle 140 is detachably implemented to be separated from the first body tube 110 and the second body tube 120.

The transmission/reception module 100 may be implemented with a structure in which a light transmission lens 112, a light reception lens 122, a circuit board 130, and a baffle 140 are assembled to be fitted into the grooves of the first body tube 110 and the second body tube 120. Specifically, the light transmission lens 112 and the light reception lens 122 are assembled in front grooves of the first body tube 110 and the second body tube 120 and then bonded to be fixed. Further, the second body tube 120 is assembled on the rear surfaces of the first body tube 110 and the second body tube 120 by a screw fastening manner to be fixed.

Accordingly, the transmission/reception module 100 optimizes the position of the baffle 140 to prevent the light reception in an undesired direction and minimizes a size of a hole of the baffle 140 and changes a shape of the baffle 140 to minimize the noise.

The light transmission baffle 141 includes a first light transmission assembly unit 142 and a second light transmission assembly unit 144. Specifically, the light transmission baffle 141 is implemented such that the first light transmission assembly unit 142 and the second light transmission assembly unit 144 are spaced apart from each other and further includes a baffle connection unit 143 connecting the first light transmission assembly unit 142 and the second light transmission assembly unit 144.

According to the exemplary embodiment of the present disclosure, it is illustrated that the light transmission baffle 141 includes the baffle connection unit 143 connecting the first light transmission assembly unit 142 and the second light transmission assembly unit 144, but is not necessarily limited thereto. The first light transmission assembly unit 142 and the second light transmission assembly unit 144 are separated from each other to be assembled in the first body tube 110.

According to still another exemplary embodiment of the present disclosure, the baffle connection unit 143 may be implemented to be extendable. Specifically, when the baffle connection unit 143 is assembled in the light transmission assembly groove of the first body tube 110, the baffle connection unit 143 is implemented to be extendable to adjust an interval between the first light transmission assembly unit 142 and the second light transmission assembly unit 144. Accordingly, the baffle connection unit 143 may be applied to a plurality of first body tubes 110 according to one light transmission baffle 141. By doing this, when the light transmission baffle 141 is applied to the first body tube 110, the light transmission baffle 141 is implemented to be extendable according to a size of the light transmission assembly groove and when the light transmission baffle 141 is assembled in the first body tube 110 according to a size of the hole of the light transmission baffle 141, the light transmission baffle is extended without being separately manufactured. At this time, the baffle connection unit 143 may be slidably extended, but is not necessarily limited thereto.

Referring to FIG. 10A, the first light transmission assembly unit 142 and the second light transmission assembly unit 144 may be implemented such that upper ends partially protrude. At this time, when the partially protruding shapes of the upper ends of the first light transmission assembly unit 142 and the second light transmission assembly unit 144 are assembled in the first body tube 110, the partially protruding shapes are assembled and fixed in the groove formed in a position which is assembled in the first body tube 110.

According to the exemplary embodiment of the present disclosure, the first light transmission groove of the first light transmission assembly unit 142 may be implemented to be larger than the second light transmission groove of the second light transmission assembly unit 144, but is not necessarily limited thereto.

The first light transmission groove and the second light transmission groove may be implemented to have the same shape as the external shape of the light transmission lens 112. For example, when the light transmission lens 112 is implemented as a longitudinal magnification lens, the first light transmission groove and the second light transmission groove may be implemented as longitudinal magnification type grooves.

According to the exemplary embodiment of the present disclosure, the first light transmission groove and the second light transmission groove may control the directionality and straightness of transmission light passing therethrough. For example, the first light transmission groove and the second light transmission groove may be implemented to limit the movement of the light transmission light and may be formed with an oval shape, but are not necessarily limited thereto.

The first light transmission groove and the second light transmission groove may be implemented to have a C-cut shape whose diameter is increased to a direction in which the transmission light enters to be emitted, but are not necessarily limited thereto.

The light reception baffle 145 includes a light reception assembly unit 146 and a bandpass filter 148. Specifically, the light reception baffle 144 may be assembled in the second body tube 120 such that the light reception assembly unit 146 and the bandpass filter 148 are spaced apart from each other.

The light reception assembly unit 146 may be implemented such that an upper end partially protrudes. When the partially protruding upper end of the light reception assembly unit 146 is assembled in the second body tube 120, the partially protruding shape is assembled in a groove formed in a position assembled in the second body tube 120 to be fixed.

A light reception groove of the light reception assembly unit 146 may be implemented to have the same shape as an outside of the light reception lens 122. For example, when the light reception lens 122 is implemented as a transverse magnification lens, the light reception groove may be implemented as a transverse magnification type groove.

According to the exemplary embodiment of the present disclosure, the light reception groove may control the directionality and the straightness of the transmission light passing therethrough. For example, the light reception groove may be implemented to limit the movement of the reception light and may be formed with an oval shape, but are not necessarily limited thereto.

The light reception groove may be implemented to have a C-cut shape whose diameter is increased to a direction in which the reception light enters to be emitted, but is not necessarily limited thereto.

According to the exemplary embodiment of the present disclosure, the light transmission baffle 141 and the light reception baffle 145 are slidably assembled in the second body tube 110 and the first body tube 120 to be fixed, but are not necessarily limited thereto.

According to the exemplary embodiment of the present disclosure, in order to prevent the light transmission in an undesired direction, the baffle 140 puts a C-cut in the light transmission groove (aperture) or the light reception groove (aperture) to allow the light to be directed only to the center. At this time, the shape applied to the light transmission groove (aperture) or the light reception groove (aperture) is not limited to the C-cut.

According to the exemplary embodiment, the absorber may be formed in the second body tube 120. Specifically, the absorber may be applied to one opposite portion of the inside, but is not necessarily limited thereto.

The absorber may be applied to a groove behind the lens of the second body tube 120, but is not necessarily limited thereto.

In the second body tube 120, the absorber which is a light absorbing material is located in a light path of the noise to reduce the noise.

According to still another exemplary embodiment of the present disclosure, the absorber may be further applied to the first body tube 110.

Figure 12:
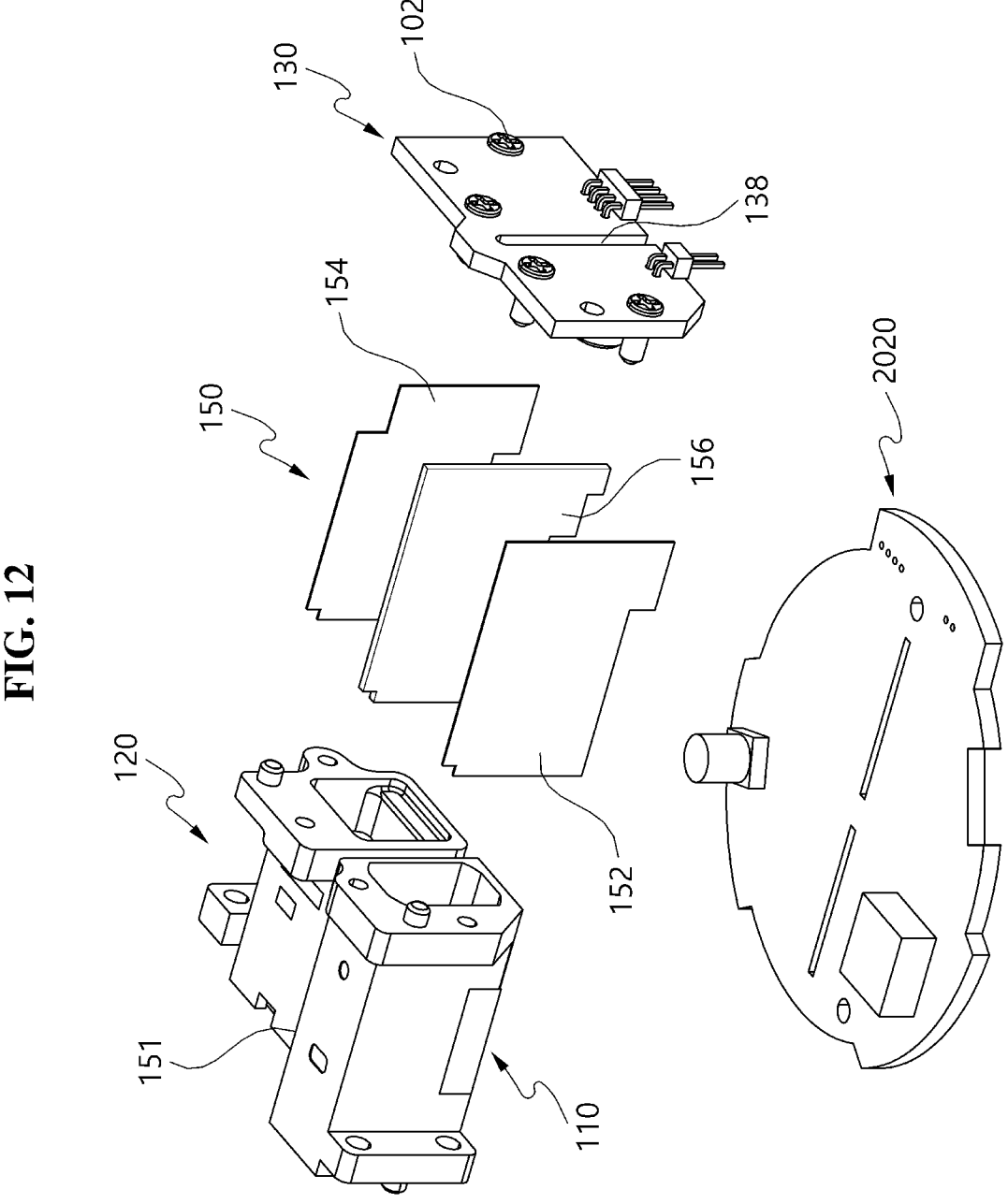
FIG. 12 is a view illustrating a transmission/reception module to which a shielding assembly unit according to an exemplary embodiment of the present disclosure is applied.

FIG. 12 is a view illustrating a transmission/reception module to which a shielding assembly unit according to an exemplary embodiment of the present disclosure is applied.

Referring to FIG. 12, the transmission/reception module 100 includes a first body tube 110, a second body tube 120, a circuit board 130, and a shielding assembly unit 150. At this time, the transmission/reception module 100 is assembled in an upper end of a first substrate 2020 of a substrate assembly 2000 of the rotary module assembly 20 to be fixed.

According to the exemplary embodiment of the present disclosure, the transmission/reception module 100 may be provided between protruding shapes formed at the upper end of the first substrate 2020. Specifically, the transmission/reception module 100 may be fixed by assembling the ground 138 of the circuit board 130 in a plurality of circular holes formed in the first substrate 2020 and a longitudinal groove may be formed between an upper side surface on which the first body tube 110 is provided and an upper side surface on which the second body tube 120 is provided, with respect to the second shielding assembly groove 138 of the circuit board 130.

The first body tube 110, the second body tube 120, and the circuit board 130 are assembled to be fixed by a screw fastening manner, by means of a screw 102. Specifically, the screw 102 is fastened with the screw fastening groove formed in each of the first body tube 110, the second body tube 120, and the circuit board 130 to be fixed and the screw fastening groove may be formed in a location where the circuit board 130 and the first body tube 110 and the second body tube 120 correspond to each other.

The shielding assembly unit 150 includes a first shielding unit 152, a second shielding unit 154, and a separation unit 156. Specifically, in the shielding assembly unit 150, the first shielding unit 152, the second shielding unit 154, and the separation unit 156 are assembled to each other to be assembled in the second shielding assembly groove 138 formed in the circuit board 130 and the first shielding assembly groove 151 formed between the first body tube 110 and the second body tube 120 to be fixed.

An empty gap may be formed between the first body tube 110 and the second body tube 120. Here, the empty gap is the first shielding assembly groove 151 and the shielding assembly unit 150 may be assembled in the first shielding assembly groove 151. Specifically, the first body tube 110 and the second body tube 120 may form the first shielding assembly groove 151 to assemble the shielding assembly unit 150 therebetween. Specifically, the first shielding assembly groove 151 refers to an interval formed by the connection line when the first body tube 110 and the second body tube 120 are connected by the connection line to be spaced apart from each other with a predetermined interval.

The first shielding assembly groove 151 refers to an empty gap formed between the first body tube 110 and the second body tube 120 by the connection line formed in the second body tube 120 and a width is determined by the length of the connection line. At this time, even though it is illustrated that the connection line 121 is formed on the second body tube 120, it is not necessarily limited thereto, so that the connection line is formed on the first body tube 110 to be connected to the second body tube 120.

According to the exemplary embodiment of the present disclosure, the shielding assembly unit 150 may be implemented to be slidably and detachable from the first shielding assembly groove 151. At this time, the shielding assembly unit 150 may be implemented to assemble the first cut portion, the second cut portion, and the fourth cut portion formed in the first shielding unit 152, the second shielding unit 154, and the separation unit 156, respectively, with the connection line. Specifically, the connection line is formed to have the same shape as the shape of the first cut portion, the second cut portion, and the fourth cut portion to connect the first body tube 110 and the second body tube 120 and is assembled with the shielding assembly unit 150 without an empty space to fix the shielding assembly unit 150 between the first body tube 110 and the second body tube 120.

According to an exemplary embodiment of the present disclosure, the first shielding unit 152 may form eight surfaces and the second shielding unit 154 may form ten surfaces, but are not necessarily limited thereto.

According to the exemplary embodiment of the present disclosure, the third cut portion may be formed to have a larger cut area than that of the second cut portion, but is not necessarily limited thereto.

The separation unit 156 may form ten surfaces, but is not necessarily limited thereto.

The first cut portion, the second cut portion, and the fourth cut portion may be formed to have the same shape, but are not necessarily limited thereto.

The first protruding portion, the second protruding portion, and the third protruding portion may be formed to have the same shape, but are not necessarily limited thereto.

According to the exemplary embodiment of the present disclosure, the shielding assembly unit 150 may be implemented by electro galvanized iron. Here, the electro galvanized iron is a steel sheet with improved corrosion resistance by coating zinc on a surface of a cold rolled steel sheet or a hot rolled steel sheet.

According to the exemplary embodiment of the present disclosure, the shielding assembly unit 150 is assembled to pass through the circuit board 130 to be fixed. Specifically, the shielding assembly unit 150 may be assembled between the first body tube 110 and the second body tube 120 to separate the first body tube 110 and the second body tube 120.

According to the exemplary embodiment of the present disclosure, the shielding assembly unit 150 is assembled between the first body tube 110 and the second body tube 120 to separate the first body tube 110 and the second body tube 120 to pass through an assembly groove formed at the center of the circuit board 130 to be fixed. By doing this, the first body tube 110 and the second body tube 120 are separated to cancel the noise.

The upper soldering unit 158 suppress the radiation which concentrically spreads at the end of the circuit board 130.

The lower soldering unit 158 suppress the radiation which concentrically spreads at the end of the circuit board 130, like the upper soldering unit 158 and is directly connected to the ground GND of the circuit board 130 to directly connect a radiation wave to the ground.

The upper soldering unit 158 may be formed on a side surface facing the second body tube 120. Specifically, when the separation unit 156 is assembled to abut with the second shielding unit 154, the upper soldering unit 158 may be implemented to be partially exposed in a direction which is assembled with the second shielding unit 154, but is not necessarily limited thereto. Here, the upper soldering unit 158 may be formed on a side surface opposite to a side surface on which the transmission/reception module 100 is provided, with respect to the circuit board 130.

Figure 13:
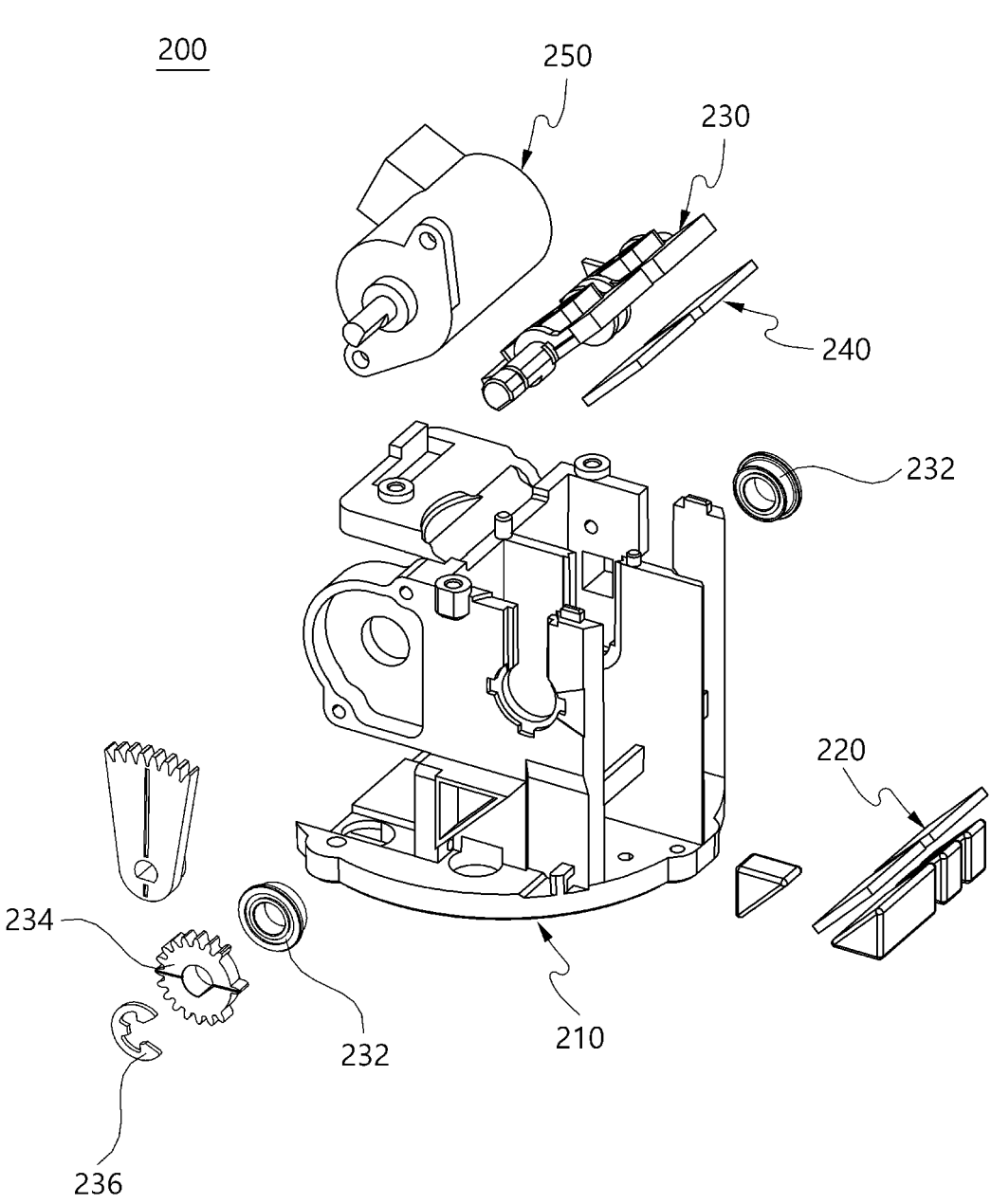
FIG. 13 is a view illustrating a reflector assembly according to an exemplary embodiment of the present disclosure.

FIG. 13 is a view illustrating a reflector assembly according to an exemplary embodiment of the present disclosure.

Referring to FIG. 13, the reflector assembly 200 includes a mirror housing 210, a first reflection unit 220, a mirror holder unit 230, and a second reflection unit 240.

In the reflector assembly 200, the second reflection unit 240 is bonded and assembled in the mirror holder unit 230.

The mirror holder unit 230 may be fixed to the mirror housing 210 by being assembled in the assembly groove formed at an upper end of the mirror housing 210, assembling the bearing 232 at both ends, and then assembling the second gear 234, and assembling the fixing ring 236. At this time, a magnet 238 may be assembled at one end of the mirror holder unit 230, but is not necessarily limited thereto.

In the reflector assembly 200, the first reflection unit 220 is bonded and assembled in the mirror housing 210. At this time, the first reflection unit 220 may be provided in a position corresponding to the transmission/reception module 100, receives transmission light transmitted from the transmission/reception module 100 and transmits the reception light reflected by the object to the transmission/reception module 100.

The reflector assembly 200 further includes a mirror driving unit 250. The mirror driving unit 250 may be assembled in the second gear 234 after assembling the mirror housing 210. Specifically, the mirror driving unit 250 may be assembled such that the first gear 252 and the second gear 234 of the mirror driving unit 250 abut with each other and provide a rotary driving force to the second gear 234 by means of the first gear 252.

The above description illustrates a technical spirit of the present invention as an example and various changes, modifications, and substitutions become apparent to those skilled in the art within a scope of an essential characteristic of the present invention. Therefore, as is evident from the foregoing description, the exemplary embodiments and accompanying drawings disclosed in the present invention do not limit the technical spirit of the present invention and the scope of the technical spirit is not limited by the exemplary embodiments and accompanying drawings. The protection scope of the present invention should be interpreted based on the following appended claims and it should be appreciated that all technical spirits included within a range equivalent thereto are included in the scope of the present invention.

What is claimed is:

1. A LIDAR sensor, comprising:
a transmission and reception module which transmits transmission light and receives reflection light reflected from an object;
a reflector assembly which has an empty space to assemble the transmission and reception module at a side, and which receives the transmission light from the transmission and reception module to reflect the transmission light toward the object and which transmits the reception light reflected from the object to the transmission and reception module;
a rotary module assembly which rotates the transmission and reception module and generates an RPM and a rotation angle based on a light reception amount of the reflection light which is received by a sensor unit by reflecting the transmitted light; and
a fixing module which supports the transmission and reception module and the rotary module assembly;
wherein the rotary module assembly includes:
a substrate assembly implemented by at least one layer so that the transmission and reception module is assembled on the side and the sensor unit is fixed to an opposite side than the side on which the transmission and reception module is assembled;
a shielding sheet which is assembled so as to be spaced apart from a side surface of the substrate assembly to which the sensor unit is fixed and shields an electromagnetic wave;
a rotary frame which is fixed so as to at least partially abut with the fixing module and which rotates with the substrate assembly and a reception sheet assembled within the substrate assembly; and a slit fixing unit which is at least partially introduced in the rotary frame to be fixed so as to correspond to the sensor unit, wherein the slit fixing unit includes:

a fixing unit which is fixed to the fixing module; and at least one slit which is assembled on a side surface of the fixing unit and reflects light transmitted by the sensor unit.

2. The LIDAR sensor according to claim 1, wherein the substrate assembly includes:

a first substrate including at least one assembly protrusion so as to assemble the transmission and reception module;

a second substrate laminated on the first substrate; and a third substrate which is laminated on the second substrate and receives power from a power transmission assembly.

3. The LIDAR sensor according to claim 2, wherein the second substrate includes a transceiver which bi-directionally transmits and receives data and is implemented to shield the interference of the transmission light and the reception light and light transmitted or received by the sensor unit.

4. The LIDAR sensor according to claim 1, wherein when a plurality of slits is provided, the at least one slit is assembled to be implemented to have the same area or different area to form a constant interval along a side surface of the fixing unit.

5. The LIDAR sensor according to claim 4, wherein the at least one slit is assembled to form a step with the fixing unit to calculate a rotation angle and an RPM of the rotary module assembly based on a boundary according to the step with the fixing unit, and the substrate assembly acquires an angular resolution based on the RPM and the rotation angle of the rotary module assembly which are calculated using a difference in light reception amount reflected by a boundary of at least one slit or the fixing unit.

6. The LIDAR sensor according to claim 1, wherein the rotary module assembly further includes:

a power transmission assembly which is assembled to be connected by passing through a hole formed in the rotary frame and the slit fixing unit which is at least partially introduced in the rotary frame to be fixed so as to correspond to the sensor unit, the power transmission assembly includes:

a power reception unit which is assembled to pass through the inside of the rotary frame to be fixed and receives a power to transmit the power to the substrate assembly; and a power transmission unit which is assembled with the power reception unit by passing through the inside of the rotary frame and transmits the power to the power reception unit.

7. The LIDAR sensor according to claim 1, wherein the rotary module assembly further includes:

a bearing which fixes a central axis of the rotary module assembly and supports a dead weight of the central axis and a load applied to the central axis, and the bearing is provided between the slit fixing unit and the rotary frame.

8. The LIDAR sensor according to claim 1, further comprising:

a rotary driving unit which is fixed to at least partially abut with the fixing unit and is connected to the rotary frame to rotate the rotary frame, wherein the rotary driving unit is connected to the rotary frame by means of a rotary connection unit to transmit a power to rotate the rotary frame.

9. The LIDAR sensor according to claim 1, wherein the transmission and reception module includes:

a first body tube which provides a path through which the transmission light moves and is assembled with a transmission lens on a front surface;

a second body tube which is spaced apart from a side surface of the first body tube, provides a path through which the reception light moves, and is assembled with a reception lens on a front surface; and a circuit board which is assembled on a rear surface of the first body tube and the second body tube, transmits the transmission light and receives the reception light to acquire distance information to the object.

10. The LIDAR sensor according to claim 9, wherein the transmission and reception module further includes:

a baffle which is slidably assembled in assembly grooves formed on a side surface of the first body tube and the second body tube and cancels a noise due to the transmission light and the reception light, and the baffle includes a light transmission baffle which is assembled on the first body tube and has at least one groove through which the transmission light passes and a light reception baffle which is assembled on the second body tube and has at least one groove through which the reception light passes.

11. The LIDAR sensor according to claim 9, wherein the transmission and reception module further includes:

a shielding assembly unit which is assembled between the first body tube and the second body tube and restricts the movement of the transmission light which passes through the first body tube to the second body tube and the movement of the reception light which passes through the second body tube to the first body tube, and the shielding assembly unit includes:

a first shielding unit which is assembled to abut with a side of the first body tube and absorbs the transmission light emitted to the outside of the first body tube;

a second shielding unit which is assembled to abut with a side of the second body tube and absorbs the transmission light emitted to the outside of the second body tube; and a separation unit which is provided between the first shielding unit and the second shielding unit to separate the first shielding unit and the second shielding unit from each other.

12. The LIDAR sensor according to claim 1, wherein the reflector assembly includes:

a mirror housing in which the transmission and reception module is assembled on a lower side;

a first reflection unit which is provided at a lower side of the mirror housing so as to correspond to the transmission and reception module;

a mirror holder unit which is assembled in an assembly groove formed on the mirror housing to be fixed to the mirror housing;

a second reflection unit which is fixed to a side surface of the mirror holder unit to rotate by the operation of the mirror holder unit and reflects the transmission light toward the object and receives reception light reflected from the object; and a mirror driving unit which provides a rotary driving force to the mirror holder unit to adjust a reflection direction of the second reflection unit.

13. A moving object, comprising:

a LIDAR sensor which transmits transmission light and receives reception light and removes transmission light or reception light moving in a predetermined direction; and a moving device which is implemented to move the moving object, wherein the LIDAR sensor includes:

a transmission and reception module which transmits transmission light and receives reflection light reflected from an object;

a reflector assembly which has an empty space to assemble the transmission and reception module at a side, and which receives the transmission light from the transmission and reception module to reflect the transmission light toward the object and which transmits the reception light reflected from the object to the transmission and reception module;

a rotary module assembly which rotates the transmission and reception module and generates an RPM and a rotation angle based on a light reception amount of the reflection light which is received by a sensor unit by reflecting the transmitted light; and a fixing module which supports the transmission and reception module and the rotary module assembly;

wherein the rotary module assembly includes:

a substrate assembly implemented by at least one layer so that the transmission and reception module is assembled on the side and the sensor unit is fixed to an opposite side than the side on which the transmission and reception module is assembled;

a shielding sheet which is assembled so as to be spaced apart from a side surface of the substrate assembly to which the sensor unit is fixed and shields an electromagnetic wave;

a rotary frame which is fixed so as to at least partially abut with the fixing module and which rotates with the substrate assembly and a reception sheet assembled within the substrate assembly; and a slit fixing unit which is at least partially introduced in the rotary frame to be fixed so as to correspond to the sensor unit, wherein the slit fixing unit includes:

a fixing unit which is fixed to the fixing module; and at least one slit which is assembled on a side surface of the fixing unit and reflects light transmitted by the sensor unit.

* * * * *